(12) United States Patent
Koelewijn et al.

(10) Patent No.: US 12,175,258 B2
(45) Date of Patent: Dec. 24, 2024

(54) COMPARATIVE SESSIONS BENCHMARKING TOOL FOR CHARACTERIZING END USER EXPERIENCE IN DIFFERENTLY CONFIGURED ENTERPRISE COMPUTER SYSTEMS

(71) Applicant: Login VSI B.V., Amsterdam (NL)

(72) Inventors: Hendrikus Koelewijn, Nunspeet (NL); Mark Hendrikus Johannes Plettenberg, Doesburg (NL)

(73) Assignee: LOGIN VSI B.V., Amsterdam (NL)

( * ) Notice: Subject to any disclaimer, the term of this patent is extended or adjusted under 35 U.S.C. 154(b) by 383 days.

(21) Appl. No.: 17/561,662

(22) Filed: Dec. 23, 2021

(65) Prior Publication Data

US 2023/0205550 A1 Jun. 29, 2023

(51) Int. Cl.
*G06F 9/44* (2018.01)
*G06F 9/445* (2018.01)
(52) U.S. Cl.
CPC ................. *G06F 9/44505* (2013.01)
(58) Field of Classification Search
CPC .................. G06F 9/32; G06F 1/32; G06F 1/12
See application file for complete search history.

(56) References Cited

U.S. PATENT DOCUMENTS

| | | | |
|---|---|---|---|
| 9,767,680 B1 * | 9/2017 | Trundle | G05B 19/042 |
| 9,785,454 B2 | 10/2017 | van de Kamp | |
| 10,635,574 B1 | 4/2020 | Damen | |
| 2015/0358790 A1 * | 12/2015 | Nasserbakht | G06F 21/32 726/19 |
| 2020/0162356 A1 * | 5/2020 | Momchilov | H04L 41/5067 |
| 2022/0360621 A1 * | 11/2022 | Tripathy | H04L 41/16 |

* cited by examiner

*Primary Examiner* — Keshab R Pandey
(74) *Attorney, Agent, or Firm* — Vierra Magen Marcus LLP

(57) ABSTRACT

A method for comparatively evaluating end user experiences (EUX's) for different configurations of an enterprise computer system includes: setting the enterprise computer system to have different first and second configurations; for each of the configurations defining a number of artificial end users and instantiating the artificial end users as each driving a corresponding workstation with a respective copy of a predefined workload for stressing the given configuration of the enterprise computer system with imposition by the instantiated artificial end users of their respective copies of the predefined workload; while the instantiated artificial end users drive their corresponding workstations with the respective copies of the predefined workload, measuring time durations for task performance attributes for each of the driving artificial end users; and comparing normalized time duration measurements of the first configuration with the normalized time duration measurements of the second configuration.

18 Claims, 9 Drawing Sheets

100' Altered Enterprise System

COMPARATIVE SESSIONS BENCHMARKING TOOL FOR CHARACTERIZING END USER EXPERIENCE IN DIFFERENTLY CONFIGURED ENTERPRISE COMPUTER SYSTEMS

BACKGROUND

Enterprise computer systems are typically structured to satisfy the needs of large multi-user organizations as opposed to individual users. Examples of such organizations include city-based, country-based and global businesses; non-profits; schools; special interest user groups (SIGs); city, state and national governmental organizations; non-government organizations and so on. Enterprise software and hardware are provided as integrated systems for use by organization members in a relatively seamless and collaborative manner. The systems preferably process information at relatively high speeds and are deployed across a variety of networks so as to provide disparately situated members of the organization with substantially similar and satisfactory end-user experiences. In order to do so, modern enterprise computer systems generally rely on Server Based Computing (SBC) and/or hosted Virtual Desktop Infrastructure (VDI) solutions that support remote access to user interfaces (e.g., Windows desktop sessions) hosted in one or more datacenters (e.g., cloud environment and/or on-premise servers). In the SBC approach, users are advanced from engaging just with their traditional, local desktop resources to having remote session hosted on a single SBC server that further hosts the remote sessions of other SBC users. The SBC users are not permitted to control the SBC server's operating system (OS) because it is a multi-user OS. Thus applications that depend on the user being the only user of the OS will fail. Moreover, applications that require a desktop-style OS will also fail. On the other hand, the VDI approach takes the traditional concept of individual desktops and virtualizes them. Each VDI user will get their very own (remotely hosted and virtualized) desktop operating under a respective (remotely hosted and virtualized) OS over which they will have whatever control they always did with their local traditional desktop setup—including the ability to reboot it and run single user apps. However, due to the increase in the number of operating system instances, the VDI approach necessarily consumes more resources and is cumbersome to manage even though it offers a more expanse array of options.

The SBC and VDI host datacenters are typically remote from the end users. Hence, one or more remoting services are typically used in the local client machines to make it appear to each end user that the remotely-hosted user-interface session (e.g., a Windows desktop session) is occurring on that user's local workstation (a.k.a. client terminal) even though it is actually being hosted elsewhere. The end user experience (EUX) is of course felt at the specific location of that user's local workstation.

When changes are made to one or more hardware and/or software resources within the enterprise computer system, such alterations can affect end-user experiences (EUX's) across the enterprise in significant positive or negative ways (e.g., due to introduction of data exchange protocols that are incompatible with legacy subsystems). Even a seemingly minor change such as upgrading a remotely disposed operating system (OS) from a version 1.1 to a hypothetical version 1.2 can have significant impact on the EUX of certain users because the version 1.2 OS is incompatible with some obscure system features. Therefore, before any change is made on a relatively non-temporary basis, no matter how minor the change may seem, system administrators may wish to develop a clear picture of how end-user experiences throughout the enterprise will likely be affected by the change. Arriving at an objectively useful assessment of effects on EUX's across the entire enterprise can be problematic.

As noted, the end user experiences are felt at the client end of the enterprise system while the remotely-hosted user interface sessions (e.g., Windows desktop sessions) and the rest of the backend processes are hosted in datacenters located remotely of the client workstations. Remoting services are used to let the client terminals access and interact with the remotely hosted processes through use of remote interaction protocols implemented over various networks such as a LAN, WAN, cellular, mobile broadband and the Internet. Both the VDI-based and SBC-based remote user interfaces can run using shared server hardware and shared server software provided in the datacenters. Thus any one change can affect both solutions. More specifically, a virtual machine monitor, or hypervisor may be used to instantiate and run virtual machines (VM's) in a specific on-premise datacenter or in a cloud environment so as to make possible the implementation of concurrent multiple virtual sessions on respective virtualized user interfaces (e.g., Windows desktop sessions) that are then replicated at respective client terminals. The latter is what the respective end users experience.

Currently, the VDI concept is generally preferred over SBC as this gives the most flexibility since each user can work on their own personal client terminal instead of relying on a shared and standardized SBC server. For both the SBC and VDI approaches, it is common to use multi-server cloud brokering services such as provided by VMware Horizon, Citrix, Microsoft Azure; Amazon AWS where resources provided by multiple servers are allocated on an as-needed basis. In both the SBC and VDI approaches, the client side at which the end user experience is felt is isolated from the hardware and software implemented on the other side of the brokered remote service(s). Although there is separation between the client side and the remote backend resources, end user experiences (EUX's) can be significantly affected by changes made to the configuration of the remote backend resources of the system, for example upgrading a specific instantiation of a virtualized OS or enterprise-shared application program and/or changing other aspects of virtual machines (VM's) that have been allocated for the end users' workloads. Testing for the effects of such configuration changes becomes problematic due to the separation and distribution of workstations about the entire enterprise and the number of end users involved.

More specifically, in the case of virtualization, each hosted desktop session (replicated at the client end) is sharing server hardware located in a remote datacenter controlled by a third party, where that shared hardware can include a hypervisor, a CPU and/or other data processor(s), memory, network links and digital data storage. These remote resources are of limited (finite) capacity per definition, and as a result each configuration solution has specific capacities, processing bandwidths and other performance-affecting quirks. It is difficult if not impossible to predict how SBC and/or VDI capacity and/or version changes will affect end user experiences unless the combinations and specific configurations of both hardware and software are fully tested. This is an important goal for IT organizations, because ultimately it is necessary to understand how much real and/or virtual hardware (servers, VM's, network and storage resources) is required to be purchased, rented or otherwise acquired in order to provide satisfactory end user experiences to a given number of end users and the respective workloads they impose on the enterprise computer system.

BRIEF SUMMARY

In accordance with one aspect of the present disclosure, a system and method are provided for simulating user stressing of an enterprise computer system due to workloads imposed on the system by artificial end users and then evaluating task performance attributes of various SBC and/or VDI solutions and/or client-side solutions and their affects on end user experience (EUX) and thereafter determining which solution will work best.

More specifically, in accordance with one aspect of the present disclosure, a computer-implemented method is provided for comparatively evaluating end user experiences (EUX's) for different configurations of an enterprise computer system where the method comprises: (a) setting the enterprise computer system to at least temporarily have, for the comparative evaluating, a predetermined first configuration; (b) defining a number of artificial end users and instantiating the artificial end users to each be able to drive a corresponding workstation with a respective copy of a predefined workload so as to be able to thereby stress the first configuration of the enterprise computer system with imposition by the respective instantiated artificial end user of the respective copy of the predefined workload; (c) while all or a selected subpopulation of the instantiated artificial end users drive their corresponding workstations and thereby stress the first configuration with their respective copies of the predefined workload, measuring task performance attributes for each of the driving artificial end users; (d) collecting and saving the measured task performance attributes of the workload imposing artificial end users; (e) setting the enterprise computer system to at least temporarily have, for the comparative evaluating, a predetermined second configuration different from the first configuration; (f) performing steps (b) through (e) for the predetermined second configuration while the measuring of the task performance attributes remains the same as that for the predetermined first configuration; (g) comparing the measured task performance attributes of the first configuration with the measured task performance attributes of the second configuration and determining from the comparison which configuration provides a better end user experience; and then (h) in response to the comparison, setting the enterprise computer system to have, on a more than temporary-for-evaluation basis, the configuration that was determined to provide the better end user experience.

With respect to the above described first aspect, the task performance attributes comprise: (a) one or more of time durations consumed for successfully and/or unsuccessfully performing the tasks and/or parts of such tasks called for by the respective copies of the predefined workload; (b) the number of times each task or a corresponding portion of the task fails (and is optionally retried); (c) the number of tasks that fail to complete successfully; (d) the types of tasks (e.g., arithmetic, text processing, graphics processing) called for by the respective copies of the predefined workload and the consumed time durations and/or success/failure rates of those types; (e) user interface latencies; and (f) communication latencies; (g) multi-threads execution pickup latencies.

In accordance with one aspect of the present disclosure, artificially-driven work sessions are instantiated and run across a virtual desktop infrastructure while using increasing numbers of artificial end users during the test runs. A summarizing end user experience value (EUXv), such as one whose value is limited to be between zero and 10 inclusive (|0-10|) is developed for each configuration as stressed by a variable number N of artificial end users. In one embodiment, the developed EUXv's are based on humanized and statistically de-skewed performance attribute measurements. These developed EUXv's can be used to compare effects on end user experiences by different enterprise configurations in a standardized manner and to then make intelligent decisions on which configurations best serve the needs of the enterprise. In one embodiment, the workloads imposed by the instantiated artificial end users include a base workload that is limited to tasks that are performed by a predetermined and substantially non-varying set of applications and functions (for example those integral (native) to a predetermined version of a family of operating systems, for example the WordPad and Paint applications integrated into all Microsoft Windows OS's as well as native functions such as file duplication, zipping (compressing) and unzipping). In the same or an alternate embodiment, the base workload imposed by the artificial end users is limited to tasks that are performed by a predetermined and strictly non-varying set of applications and functions. However, that strictly non-varying base workload can be supplemented by addition of one or more new applications (e.g., enterprise-specific applications that most users are expected to use) and/or OS's whose effect(s) on end user experience is(are) to be determined. Since only the predetermined and (substantially or strictly) non-varying set of applications and functions are used for the base workloads, and enterprise-common applications are also added on for some stress tests, all tested configurations are stressed by essentially same workloads while using essentially same measurements of task performance attributes. In other words, the base workload is not changed due to version update creep in some or all of the applications and functions that constitute the base workload. The measurings of task performance attributes do not change from one system configuration to a counterpart second such configuration. This allows for comparing apples to apples, so to speak, as between the to-be-comparatively-evaluated, different system configurations instead of comparing on an apples to oranges basis.

In one embodiment, the summarizing end user experience value (EUXv) is an output of a function that substantially saturates at its extreme ends, for example one that saturates to the value 10 at its high end and approaches zero at its low end. An example is a function of the form $f(x)=10/(1+g(x))$ where $g(x)$ is never negative. The reason for using such a dual ended substantially saturating function is because realistic end user experience of human beings saturates as being good/acceptable at one end of the experience spectrum no matter how much shorter task turnaround time is made (e.g., anything less than a third of a second) and the experience saturates as being bad/unacceptable at the opposed end of the experience spectrum no matter how much longer task turnaround time becomes (e.g., anything beyond 20 seconds is bad). In one embodiment, stress-creating artificially-instantiated workstations are placed about different parts of the under-test enterprise computer system and EUX measurement statistics are developed for characterizing not only the average EUXv across the whole enterprise but also median values, skew values (balance), consistency values in order to obtain a more comprehensive understanding of how end user experience is affected by changes to the configuration of the enterprise computer system.

The present technology can be accomplished using hardware, software, firmware or various combination permutations hardware, software and firmware. The software used for the implementing embodiments of the present disclosure of invention is nontransiently stored in one or more processor readable storage media including hard disk drives, CD-ROMs, DVDs, optical disks, floppy disks, tape drives, RAM, ROM or other suitable data storage devices. In alternative embodiments, some or all of the software can be replaced by dedicated hardware including custom integrated circuits, gate arrays, FPGAs, PLDs, and special purpose computers. In some embodiments, at least part of the software is used as source or object code for execution by one or more processors. The processors can be in communication with one or more storage devices, peripherals and/or communication interfaces.

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The present disclosure of invention will now be expanded on with reference to several figures, which in general, relate to an apparatus and method for imposing workloads on a enterprise computer system by way of instantiated artificial end users who operate on real or virtual workstations in manners similar to how human users do. The apparatus and method evaluate end user experiences (EUX's) as experienced by the artificial end users. In one embodiment, EUX's of the artificial end users are determined while driving a first configuration of the enterprise computer system. Then alterations are made to hardware and/or software of the enterprise computer system to thereby define a, perhaps temporary, second configuration. The EUX's of the artificial end users are determined again for comparison with the EUX's of the first configuration. The configuration having the better EUX's is then used for a live running environment primarily populated by human end users as opposed to the artificial end users. In another embodiment, while the live running environment is operating and is primarily populated by human end users, a smaller population of artificial end users is instantiated and their EUX's are monitored for purpose of detecting significant changes in the monitored EUX's. System administrators are alerted when significant changes are detected. It is understood that the present disclosure provides nonlimiting examples and the underlying concepts may be embodied in many different forms and should not be construed as being limited to the exemplary embodiments set forth herein.

Figure 1A:
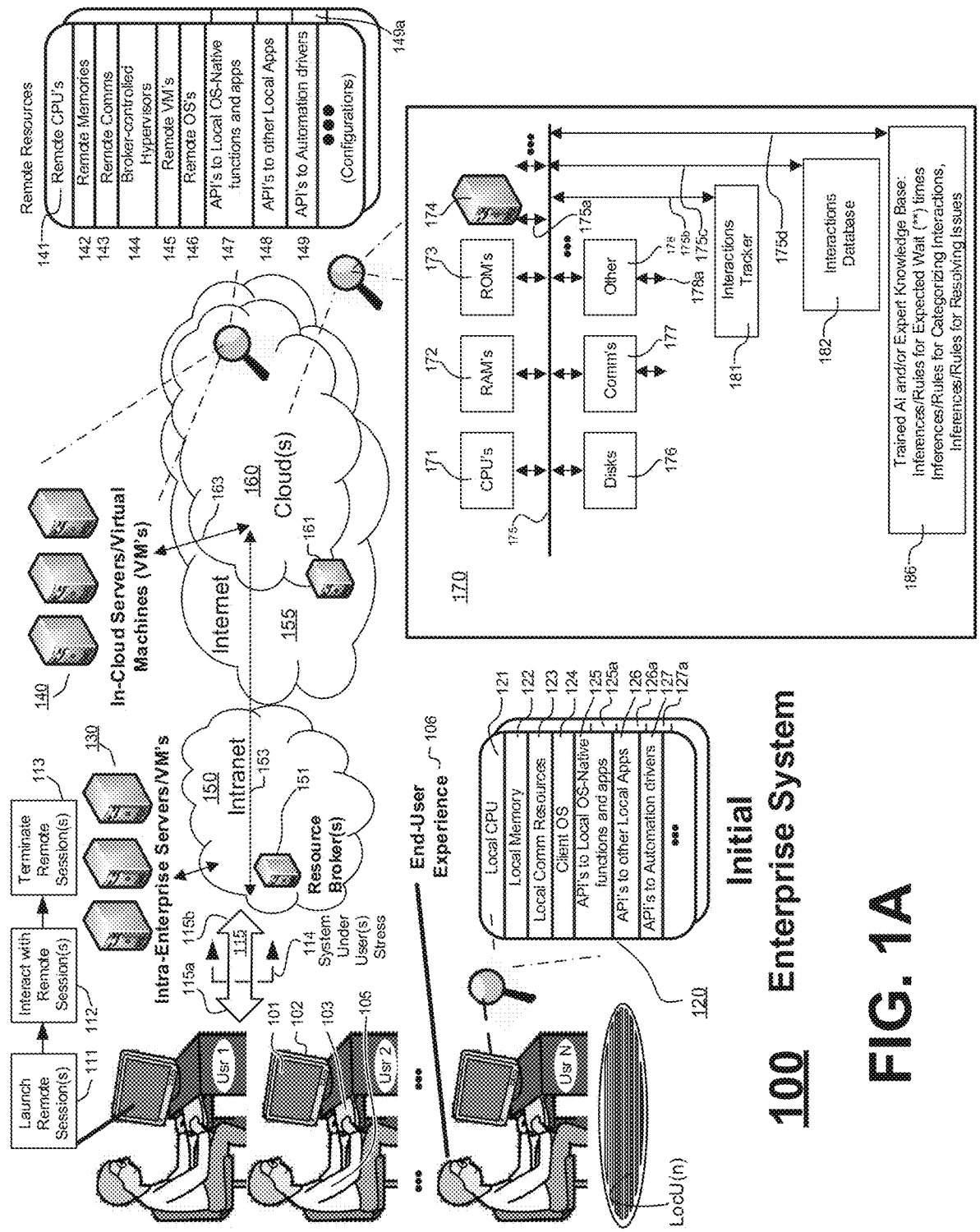
FIG. 1A is a block diagram of a configuration of a first enterprise computer system that can be stressed by workloads presented to it by numerous human end users.

Referring to FIG. 1A, there is shown a high level block diagram of an enterprise computer system 100 in which the here-disclosed stressing by artificial end users and evaluating of their EUX's may be implemented. In a first configuration, the system 100 may include a plurality of end user terminals or workstations 101/102/103 that can be operated by respective human members of the enterprise organization (e.g., Usr-1, Usr-2, . . . , Usr-N), each situated in a respective user location (e.g., LocU(n)). More specifically, each given user 105 is provided with operative access to one or more input devices 103 (e.g., keyboard, mouse, touch pad, microphone, camera, etc.) and one or more output devices 101 (e.g., high resolution display, speakers, printers, haptic outputs, etc.). The input and output devices 103, 101 are operatively coupled to local data processing resources 102 (e.g., one or more client side computers) that are configured to support remotely-hosted graphical user interface sessions (e.g., virtualized Windows desktop sessions), for example those that operatively couple to VDI or SBC enterprise solutions hosted in one or more remote datacenters. The end user terminals or workstations 101/102/103 may be in the form of one or more of a user's laptop computer, tablet computer and smartphone rather than the depicted desktop computers. Moreover, the input/output devices may be merged for example in the form of touch and/or light sensitive display screens rather than the depicted individual devices 101, 103.

A communications fabric 115 is provided for linking the client-side situated end user workstations 101/102/103 with remote resources of the enterprise computer system 100. Although not shown in FIG. 1A, signaling between the client-side situated end user workstations and remote resources is carried out in accordance with predetermined signaling protocols under control of signaling enabling applications respectively provided in the workstations and remote resources. (See briefly 132 and 133 of FIG. 1D.) The illustrated symbol in FIG. 1A for the communications fabric 115 is not intended to depict its physical extent. Actually right arrow 115b is not a true end. The communications fabric 115 continues, as indicated by symbol 153, into the linkages of the illustrated Intranet 150 and then from there into the illustrated Internet 155 and further into the illustrated one or more clouds 160 which is/are contained within the Internet 155. The Intranet linkages 150 provide access to the illustrated Intra-Enterprise servers and their hosted virtual machines (VM's) 130. The cloud linkages 160 provide access to the illustrated In-Cloud servers and their hosted virtual machines (VM's) 140. Typically, the client-side end users 105 do not have direct access to the Intra-Enterprise servers/VM's 130 or the In-Cloud servers/VM's 140 but rather have access to these remote resources as mediated by resource brokering services (symbolically represented by servers 151 and 161). The mediating resource brokering services 151/161 can be situated in the Intranet 150 (as shown for brokering service(s) 151) and/or in the Internet or Cloud 155/160 (as shown for brokering service(s) 161) and can determine how many VM's and/or which portions of the VM's (instantiated inside the Intra-Enterprise servers 130 or in the In-Cloud servers 140) is/are allocated for servicing each end user's workloads and what the various performance attributes of those VM's will be under ideal conditions (e.g., data processing bandwidths, memory capacities and read/write bandwidths, communications capacity and send/receive bandwidths, and so on). Linkages of the communications fabric 115 and beyond may take one or more of many forms including, but not limited to, wired and wireless networks such as a LANs, WANs, mobile broadband connections and the Internet links. Aside from the cloud(s) 160 which can be considered as being contained within the Internet 155, the latter 155 will have its own servers (not shown) which may host VM's, websites, and whose remote resources the end user can access. The resources of the rest of the Internet 155 can also be accessed by resources within the cloud(s) 160 and within the Intranet 150 depending on security permissions. For sake of reference, the end of the communications fabric symbol 115 coupling to the depicted, client-side end-user workstations 101/102/103 will be referred to as the client-side end 115a while the opposed right end 115b that continues into the Intranet 150 and/or into the Internet 155 and contained cloud or clouds 160 will be referred to as the remoting end 115b. The portion 114 of the enterprise computer system to the right of the depicted client end 115a may be considered the system's remote portion under user stress when plural human users (Usr-1, Usr-2, . . . , Usr-N) are using remoting services (as brokered by 151/161) to interact with remote resources of the system and tasking them with data processing jobs. The stressing interactions generally comprise that of each user 105 imposing a respective workload (e.g., one composed of requesting one or more computing tasks and responsive actions and/or feedbacks) to/from the remote resources. The portion of the enterprise computer system to the left of the depicted dividing line 114 may be considered the client side.

A user workload imposition typically commences with the user logging into the system and requesting a launching 111 of a remotely-hosted work session. A user may launch more than one such remote session. The launch process may include having the local client computer (102) utilize locally-installed remoting software (not shown in FIG. 1A, can be considered as part of non-native apps 126a) to send a request, using predetermined remote session launch and maintain protocols to a remoting-services-providing brokering server 151 or 161 (there can be more than one of each). The brokering server 151/161 or a resource allocation server associated with the brokering server may then allocates various remote resources for use in the launched session such as remote CPU bandwidth (real or virtual), number of CPU's (or VM's), memory space, communication resources, and so on. A graphical or other user interface window (not shown) then responsively appears on the client-side display 101 to make it appear to the respective end user 105 as if the remotely-hosted operations were taking place on that user's local workstation. However, in fact, parts or wholes of remotely located servers 130/140 are being commandeered to carry out the computing tasks driven from the client side 115a during the duration of the remote session(s) 112. When a remote session ends 113, the remoting services providing brokering server 151 relinquishes the resources commandeered for the session and they are returned to a free pool for use by other sessions.

While one or more remotely hosted work sessions are taking place, additional work may be carried out within the client-side workstations. End user experience may be dependent on capabilities of the client-side resources, on capabilities of the remote-side resources and on capabilities of the communications fabric 115/153 that provides communications between the client-side resources and the remote-side resources. The local and/or remote resources may be subject to less than ideal operating conditions due to any of a wide variety of fault or failure occurrences including, but not limited to, signaling interferences in the communications fabric, processing congestions in data processing and/or data storing resources, power surges or outages, temperature variations, and so on. In accordance with one aspect of the present disclosure, it may be desirable to determine which provides for a better end user experience (EUX) under real world operating conditions: (a) adding a new form of stressing (e.g., a new application) to the client-side resources, (b) adding the new stress to the remote-side resources and/or (c) splitting up the new form of stressing to occur partly in the client-side resources and partly in the remote-side resources. In the cases where the stressing is placed on the remote resources, it may further be desirable to determine whether that new stressing (e.g., executing the new application) should be placed on the Intranet portion 150 of the system or on a cloud portion 160 (there can be more than one cloud each brokered by a respective brokering service 161).

For sake of completeness of this introductory description, further details are explicated with respect to the client side and remote resources side of the exemplary enterprise computer system 100. Each client side computer 102 may include a respective one or more CPU's 121 or other such data processing units, one or more local data storage resources (RAM, disk, etc.) 122, local communication resources 123 and further hardware and software drivers for servicing peripheral devices (e.g., 101, 103). Additionally, the software and/or firmware 120 of each respective client side computer 102 may include a corresponding operating systems (OS) 124. Moreover, the software and/or firmware 120 of each respective client end computer 102 may include corresponding shell linkages (e.g., API's) 125 by way of which applications can interact with some of the OS-internal basic functions (native processes) and with native applications that are generally provided integrally with the OS (e.g., Wordpad, Paint, UnZip typically included with Microsoft's Windows family of operating systems). To avoid illustrative clutter in FIG. 1A, the OS-internal basic functions (native processes) and the native applications themselves are indicated as lying at 125a under their respective API's. This is to be also implicitly understood for all such further API's shown in the drawings. Aside from the native applications, the client side computer 102 may have installed in it third party applications 126a that are not native to the operating system and those installed non-native applications may provide API's (application program interfaces) 126 for accessing certain functions of those non-native applications 126a. Typically, each client side computer 102 may include one or more automation enabling drivers 127a (such as for example Selenium™ for accessing browser internals and UI-Automation™ for accessing Microsoft OS internals). These automation enabling drivers 127a enable scripts and batch programs to execute automatically on the client side computer 102; for example during boot up, and to access internals of the OS or browsers as may be desired.

As noted above, for the purpose of enabling remote sessions, each respective client side computer 102 will include a remote session(s) launcher (not explicitly shown, understood to be inside 126a) that allows the respective user 105 to log on, to launch, and to maintain a remote work session utilizing appropriate remoting protocols. The local communications support software 123 may include resources installed for hosting remote signaling in accordance with the protocols. Each human user 105 may determine which local client resources he/she uses and how often. The local client resources may include work-automating scripts including those that launch a remote work session. Then the human user may determine which remote resources he/she uses, how often, and to what extent. This constitutes the client user's stressing of remote resources. Typically, the human end user will interact with a graphical (GUI) and/or other form of user interface (UI—not shown) presented on his/her client-side device (e.g., on 101) when submitting tasks for performance by remote resources (e.g., 130, 140). When plural users (Usr-1 through Usr-N) are logged into remote sessions, it is the totally of their respective and concurrent workloads that will contribute to current stressing of the remote resources. One way that stressing can increase is by increasing the number of active users. Another way that stressing can increase is by increasing the complexity of the tasks that the users impose on the remote resources. And as noted above, in the real world, stressing is not limited to what the individual end users alone do because fault and failure conditions may arise due to congestions, power outages, and/or other environmental stresses.

While not shown in FIG. 1A (for sake of reducing illustrative clutter), aside from the client-side end users, the enterprise computer system 100 will have further users who act as system administrators. These folk typically determine the amount and power of the remote resources available to the individual end user who are members of the enterprise organization. Of course there is always a balance to be maintained between costs, benefits and security concerns. The administrators generally want to be efficient with their capital and operating costs while still providing the enterprise members with satisfactory end user experiences (EUX's) 106. As the environment of the organization changes, the administrators may want to proactively plan for reconfiguration of the enterprise computer system 100 to meet those changes. Part of the proactive planning is that of determining how different ones of contemplated changes will affect end user experiences (EUX's) 106 in all or most parts of the enterprise computer system 100.

The configuration attributes of the enterprise computer system 100 include the types and numbers of end user computers (101/102/103; e.g., laptops, tablets, etc.). The configuration attributes may further include the organizing of the intra-enterprise servers 130 (also referred to as on-premise servers although not always all located in one place) and the VM's instantiated in those intra-enterprise servers 130. The intra-enterprise servers 130 are owned, possessed, and/or fully controlled by the enterprise organization so that the system administrators of the enterprise can maintain full control over the security and reliability of those intra-enterprise servers 130. However, for sake of convenience and cost efficiency, the system administrators may elect to offload some or all of their remote workload needs onto the in-cloud(s) servers 140 over whose remote resources the enterprise organization obtains shared access by use of a third-party brokering services 161 such as VMware Horizon, Citrix, Microsoft Azure; Amazon AWS and so on. In the latter case, the administrators will pay the third-party brokering services 161 according the extent that they use in-cloud resources 160 provided by those third parties. The administrators will nonetheless have control over the number of in-cloud virtual machines (VM's) 145 they are allocated, what operating systems (OS's) 146 will be instantiated in those VM's, how much memory 142 will be instantiated for each VM and what kinds (volatile, nonvolatile, high speed, high capacity, etc.), how much CPU bandwidth 141 will be allocated, what software 148 will be instantiated in those VM's, and so on. As is the case for the client side computers, the in-cloud servers 140 will include their respective remote-side CPU's 141, remote-side memory resources 142, remote-side communication resources 143. Additionally, the in-cloud servers 140 will include respective hypervisors 144 that are controlled by their respective brokers 161 (or by resource allocation servers associated with brokers) for determining which customers of the brokered cloud services 160 will receive access to what shared resources and when. Similar to the client side computers, the in-cloud servers 140 will include respective automation enabling (scripting enabling) drivers (e.g., UI-Automation™) and API's 149 to those drivers.

Still referring to FIG. 1A, a further walk through is provided here with respect to detailed components that may be found in one or more of the client devices 101/102/103 and/or respective real servers, where the latter can host virtual machines (VM's). It is to be understood that each mentioned item of software generally comes in the form of nontransiently recorded digital code (i.e. object code and/or source code) that is defined and stored in a memory for instructing a target class of data processing units to perform in accordance with predefined application programs or native OS functions.

Enterprise administrators may be responsible for maintaining in good operating order their portions of the system (e.g., client side user devices 101-103, intra-enterprise servers 130 and/or in-cloud computing resources 140). Accordingly, the depicted system 100 is shown as including in either the cloud(s) 160 and/or the intra-enterprise servers 130 at least one server 170 that has a trained artificial intelligence subsystem (AI) and/or an expert knowledge base 186 which contains various kinds of different expert rules and/or developed AI for handling different conditions. One set of expert rules may relate to categorizing different types of transactions and details about how to handle them, including how to resolve various problematic issues. Although shown as if located in the cloud, the AI and/or expert knowledge resources may alternatively or additionally reside in the Intranet and/or in the client-side workstations. In particular, in some embodiments (to be described in conjunction with FIG. 1D) the client-side workstations include AI and/or expert knowledge resources for determining the nature of imagery data destined for display on the local displays 101 of those client-side workstations.

In addition to the AI system and/or expert knowledge base 186, one or more other portions of the system 100 may contain interaction tracking resources 181 configured for tracking interactions between end-users 105 and respective system resources and an interactions storing database 182 configured for storing and recalling the tracked interactions. Links 183a (to a further server 174) as well as links 183b, 183c and 183d represent various ways in which the system resources may communicate one with the other.

As mentioned, block 170 is representative of various resources that may be found in client workstations and/or the various servers. These resources may include one or more local data processing units (e.g., CPU's 171), one or more local data storage units (e.g., RAM's 172, ROM's 173, Disks 176), one or more local data communication units (e.g., COMM units 177), and a local backbone (e.g., local bus 175) that operatively couples them together as well as optionally coupling them to yet further ones of local resources 178. The other local resources 178 may include, but are not limited to, specialized high speed graphics processing units (GPU's, not shown), specialized high speed digital signal processing units (DSPU's, not shown), specialized high speed arithmetic units (not shown), custom programmable logic units (e.g., FPGA's, not shown), analog-to-digital interface units (A/D/A units, not shown), parallel data processing units (e.g., SIMD's, MIMD's, not shown), local user interface terminals and so on.

It is to be understood that various ones of the merely exemplary and illustrated, in-server resource units (e.g., 171-178) may include or may be differentiated into more refined kinds. For example, the local CPU's (only one shown as 171) may include single core, multicore and integrated-with-GPU kinds. The local storage units (e.g., 172, 173, 176) may include high speed SRAM, DRAM kinds as well as configured for reprogrammable, nonvolatile solid state data storage (SSD) and/or magnetic and/or other phase change kinds. The local communication-implementing units (only one shown as 177) may operatively couple to various external data communicating links such as wired, wireless, long range, short range, serial, parallel, optical kinds typically operating in accordance with various ones of predetermined communication protocols (e.g., internet transfer protocols, TCP/IP, Wi-Fi, Bluetooth™, UWB and so on). Similarly, the other in-server resources (only one shown as 178) may operatively couple to various external electromagnetic or other linkages 178a and typically operate in accordance with various ones of predetermined operating protocols. Additionally, various kinds of local software and/or firmware may be operatively installed in one or more of the in-server storage units (e.g., 172, 173, 176) for execution by the local data processing units (e.g., 171) and for operative interaction with one another. The various kinds of local software and/or firmware may include different operating systems (OS's), various security features (e.g., firewalls), different networking programs (e.g., web browsers), different application programs (e.g., product ordering, game playing, social media use, etc.) and so on.

Figure 1B:
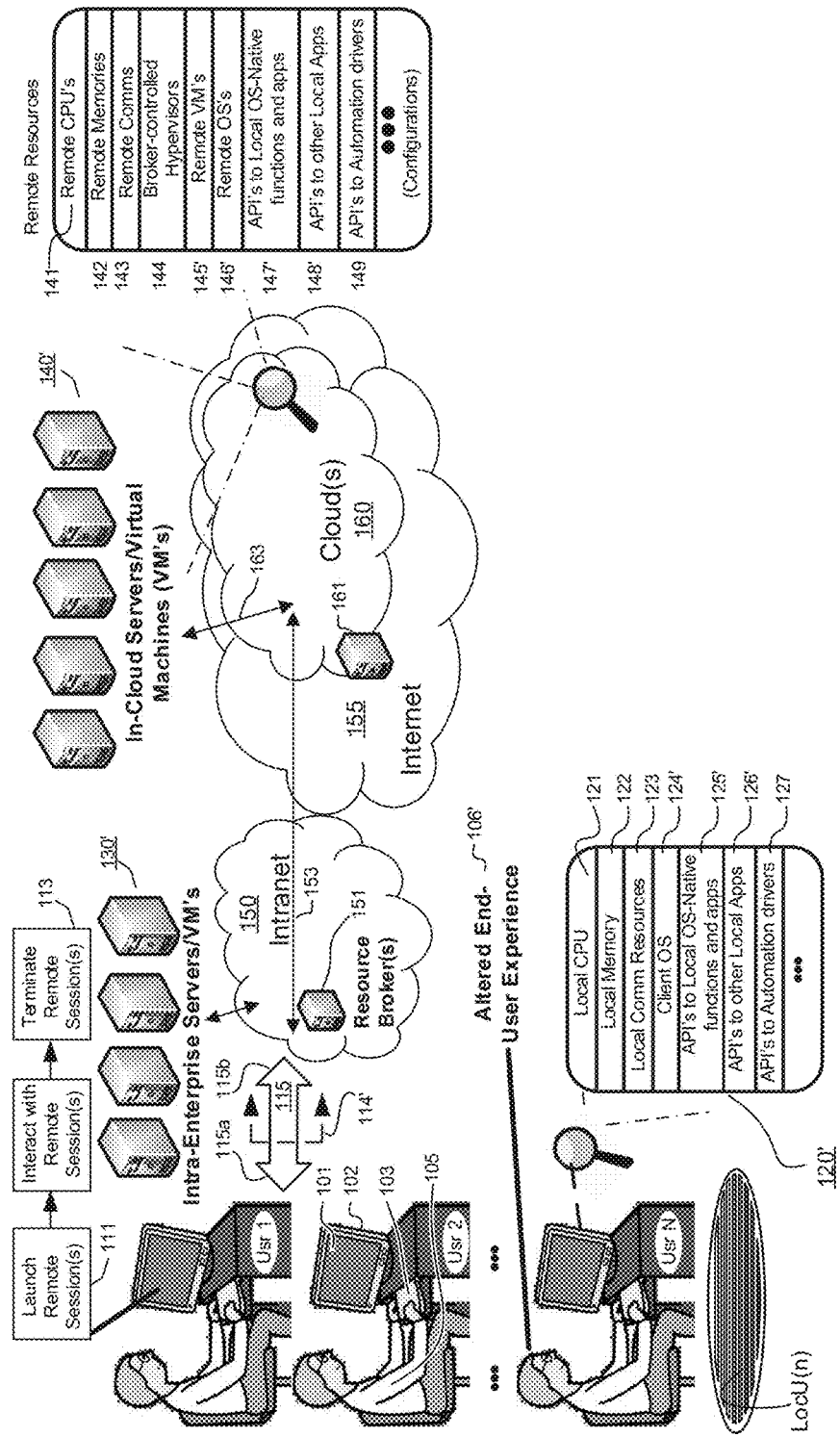
FIG. 1B is a block diagram of a differently configured second enterprise computer system that can be stressed by workloads presented to it by numerous end users.

Referring to FIG. 1B, one of the reconfigurations that enterprise administrators may contemplate is that of changing the numbers and/or sizes (e.g., memory sizes, memory read/write speeds, CPU bandwidths, etc.) of the deployed remote resources in the so-called, on-premise servers/VM's 130 and/or in the in-cloud servers/VM's 140. The contemplated reconfigurations are not limited to real or virtual hardware-type resources and instead may be or may include alterations real or virtual hardware-type resources; for example upgrading to a newer version operating system (OS) 146', adding a new application 148' that end users will be using as part of their respective workloads, and so on. Any of such changes may result in altered end user experiences 106' either across the entire enterprise computer system or just in certain locations (e.g., LocU(n)). The administrators will wish to obtain a relatively accurate and useful understanding of how such contemplated reconfigurations will affect end user experiences (EUX's) for their various human users 105 across the altered enterprise computer system 100'. Merely for purpose of example the number of servers 130' and 140' in FIG. 1B are shown to have been increased although the contemplated reconfigurations may have been to instead decrease the numbers. The contemplated reconfigurations may have included adding or removing certain application programs to/from the client-side devices; adding or removing certain application programs to/from the remote-side devices; changing the OS's used in the client-side devices and/or in the remote-side devices, and so on. Before undertaking such contemplated reconfigurations, the administrators will want to know if there will be positive or negative impacts to end user experiences (EUX's) 106' under real world conditions and if so, to what user-appreciable extent.

Figure 1C:
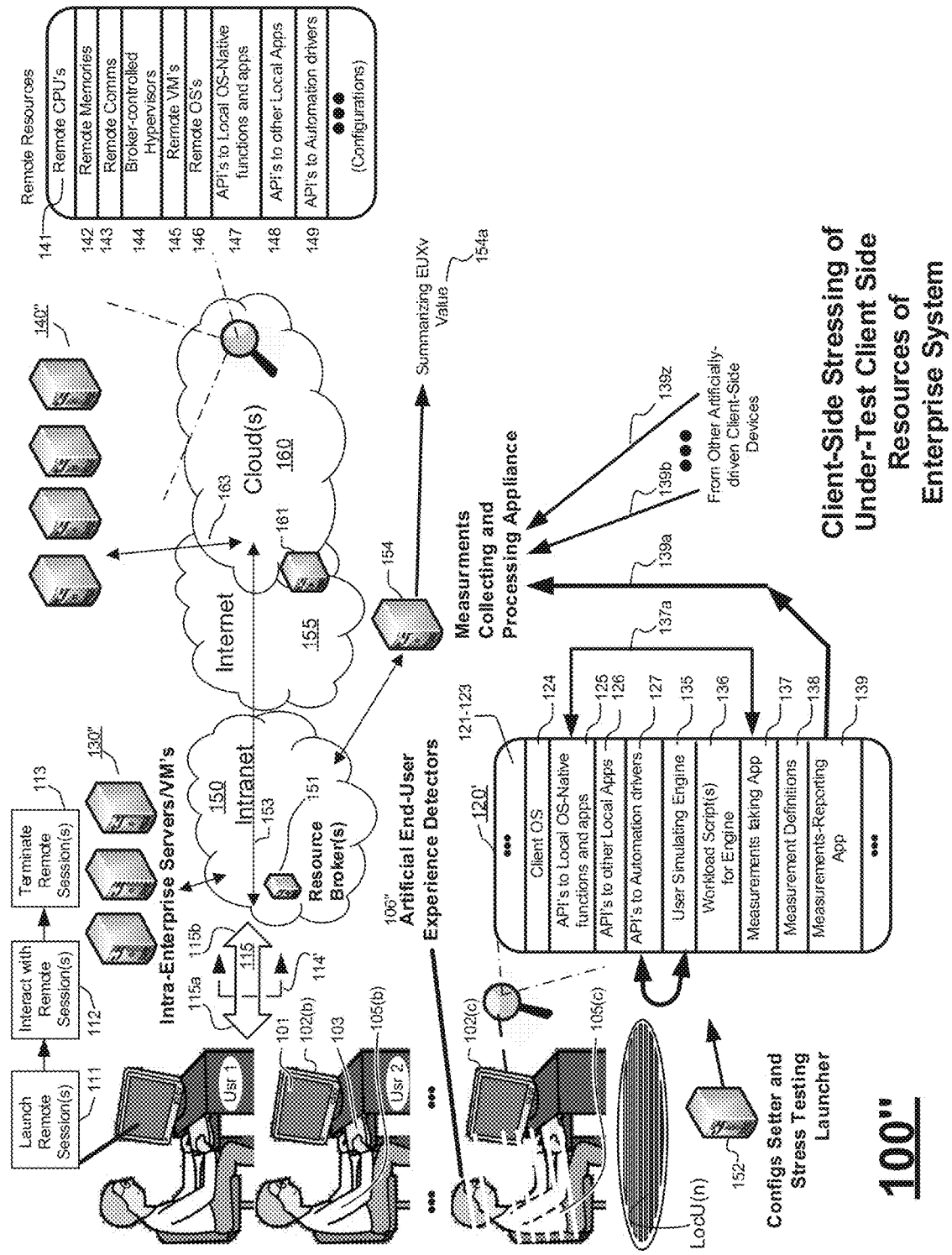
FIG. 1C represents a stressing of each of the first and second enterprise computer systems by means of artificial end users instantiated at the client side of the system where measurements are taken only for stress placed on client side components.

FIG. 1C illustrates a first method and system 100" in accordance with the present disclosure for measuring effects on end user experience 106"; in this first case; where the reconfigurations are only in the client-side resources. The first method operates by driving one or more of the client-side physical devices (e.g., 102(c)) with respective artificial end users 105(c) rather than by human users (105(b)) and at the same time detecting task turnaround times (as well as task success and failure rates) experienced at the client-side. (The white hash lines in FIG. 1C through user 105(c) indicate he/she is virtual as opposed to physical. The lack of white hash lines in FIG. 1C through workstation 102(c) indicate it is physical rather than virtual.) In order to simulate end-users such as 105(c), a user-simulating engine 135 is installed into each of the client-side physical devices (e.g., 102(c)). In one embodiment, a configurations setting and stress tests launching server 152 (e.g., one located in the intranet) is used to automatically install the user-simulating engines 135 into respective ones of the client-side workstations 102(c) that will by respectively driven by their artificial end users 105(c). After the user-simulating engines 135 are installed, the stress tests launching part of server 152 launches all of them or a predetermined subset of them. Each user-simulating engine 135 operatively couples to one or more of the automation drivers 127 of its respective workstation 102(c) so that when the engine 135 is executed, in one embodiment the engine 135 activates a first script that performs a log-in for a respective local workload session (not a remote session). As noted, in one embodiment, after the installations are complete the configurations setting and stress tests launching server 152 automatically launches the user-simulating engine 135 in each workstation that is designated for stress testing the client-side resources. At the same time as the launched engines 135 try to log-in to the client-side OS's (or are later sending other tasks from their workload scripts to the automation drivers 127), a measurements-taking thread 137 (also installed and launched by the configurations setting server 152) is activated to determine the time of when each initial attempt at log-in takes place, the time when the attempted log-in succeeds and the times if any when the attempted log-in fails and needs to be retried. This information is sent to a centralized measurements collecting and processing appliance 154 together with identification of the specific client-side device (e.g., 102(c)) under test and specification of other attributes of the specific client-side device under test (e.g., OS version number, display resolution, memory types and capacities, etc.) for storage therein and later analysis. In an alternate embodiment, the engine does not take measurements for the log-in process.

After the automatically initialed log-in succeeds, the engine 135 activates a second script from area 136 that sends one or more workload tasks to the local work session that was just logged into. The task requests are formulated by way of interactions with one or more user interfaces (e.g., GUI's) similar to how they would be formulated by human end users (e.g., scrolling a cursor via mouse movements, activating choice menus and clicking on desired choices, etc.). While each of the to-be-locally-performed workload task is attempted, the measurements-taking thread 137 is activated to determine various task performance attributes such as the time of when the initial attempt at performing the workload task takes place, the time when the attempted performance succeeds and the times if any when the attempted performance fails and needs to be retried. Since the measurements-taking thread 137 is located inside the same workstation where the workload task is being performed, the measurements-taking thread 137 can hook (137a) into the API's 125 of the local OS to detect local event reports including, but not limited to, when a workload task is initiated in its intended type-of target components (e.g., CPU/memory interaction tests), when it successfully completes, how many retries are undertaken due to error or other issues, the types of errors encountered, and so on. The measurements-taking thread 137 sends its acquired measurements for storage in a measurements-reporting application 139 and the latter reports the results 139a at an appropriate time to the centralized measurements collecting and processing appliance 154. It is to be understood that in addition to the user-simulating engine 135, the configurations setting server 152 also installs into each respective, system stressing workstation (that is being driven by an artificial user 105(c)) the illustrated workload scripts 136 and measurements-reporting application 139 as well as measurement definitions 138 that define what types of measurements are to be taken and reported (139a). As indicated by reporting paths 139b, . . . , 139z; similar actions are undertaken by others of N local workstations that are driven by their respective user-simulating engines 135 (where N is a predetermined number of stress-applying workstations and N can be incremented; for example from 10 to 100 to 1000 to 10,000 and so on). The measured results 139a, 139b, . . . , 139z are collected by the centralized measurements collecting and processing appliance 154 and then analyzed as shall be detailed later below.

In accordance with the present disclosure, a substantially same set of script-defined tasks to be performed is used when stressing a first configuration of the enterprise computer system 100 and when stressing a different second or further other configuration of the enterprise computer system. In accordance with the present disclosure, substantially same measurings of task performance attributes are performed when stressing the first, the different second or further other configurations of the enterprise computer system so that end user experiences (EUX's 106") for each of the artificial users 105(c) can be compared on an apples versus apples basis for each of the first, second and optionally additional different configurations of the enterprise computer system 100 that are being compared to one another. The script-defined tasks will typically include tasks that exercise a to be stressed local or remote resource alone or in combination with other resources; for example: stressing a client-side or remote CPU 121/141 alone; stressing the CPU in combination with one or more of its allocated data storage devices (e.g., 122/142) while they interact with one another, executing a program that uses multiple resources, and so on; for example according to LISTING-1:

(1) LISTING-1: Non-varying predetermined System stressing tasks:
(1a) CPU/MEM: Memory copy
(1b) CPU: Simple arithmetic and binary operations (add, multiply, shift)
(1c) CPU: complex floating point arithmetic operations (double or higher precision adds, multiplies)
(1d) DISK: Large file copy
(1e) DISK: Many files copy The script-defined tasks to be performed will also typically include exercising non-varying predetermined applications similar to OS-native programs through usual actions; for example according to LISTING-2:

(2) LISTING-2: Stressing with Non-varying predetermined applications similar to Native Application tasks (e.g., those of the Microsoft Windows™ family):
(2a) Wordpad (start, open_file, replace, save, open print window)
(2b) Paint (start, open_file, flood-fill, save-as-jpeg, save-as-png)
(2c) Zip/Unzip (low/high compression, encryption to avoid caching)

More specifically, one example of timed script actions is per the following LISTING-3 with Microsoft OS commands encased in single quotes:
(3) Listing 3A:
(3a) 'WORDPAD_OPEN_FILE': Opens a specific file of the OS built-in WordPad application in the local workstation or remote VM, for example a file named TestDoc.rtf of around 2 Mb, which contains text and pictures. At the same time the command is sent to the local workstation or remote VM, a first stopwatch thread is started by the OS 124 of the client-side machine 102(c) to measure how long it takes until a WordPad window is instantiated on the local Desktop having the window title of 'TestDoc.rtf'.
(3b) 'PAINT START': Starts up the MS OS built-in "Paint" application in the local workstation or remote VM and at the same time this command is sent to the remote session, a second stopwatch thread is started by the OS 124 of the client-side machine 102(c) to measure how long it takes until a Paint window is instantiated on the local Desktop and becomes active so as to accepts user inputs into the "Paint' application executing in the local workstation (or remote VM if remote stressing is instead taking place).
(3c) 'PAINT_OPEN_FILE': Opens a specific file, for example one named 'TestDoc.gif' of around 1.5 Mb. At the same time this command is sent to the via the local work session, a third stopwatch thread is started by the OS 124 of the client-side machine 102(c) to measure how long it takes until a Paint window is instantiated on the local Desktop having the title of 'TestDoc.gif'.
(3d) 'PAINT_FLOODFILL': Performs a 'flood-fill' operation in the currently open and active Paint image. At the same time this command is sent to the locally-hosted work session, a fourth stopwatch thread is started by the OS 124 of the client-side machine 102(c) to measure how long it takes until a specific predetermined pixel in the locally displayed image has the color of the flood-fill operation. In one embodiment, the image is partly covered by a maze, so that it is clear that the operation is finished when that pixel has the required color.

(3e) 'SYS_CPU_OPERATIONS': Performs a specific set of CPU operations, and measures how long it takes to run them, say 7 million times.

(3f) 'SYS_ZIP_FILES': Creates 10 zip files, around 200 Kb each containing random contents in a random amount of files. The randomization is seeded with a fixed number so that each run will produce the same file structure. Each file is unique, because they contain generated GUID's (Global unique identifiers). The number of files, file size and contents can change in alternate iterations. The created zip files are then saved to disk at the remote machine and the save is followed by load and extract operations. Client-side timers are instantiated to measure how long it takes to perform each of the steps of all these zip operations by the remote session.

(3g) 'SYS_CREATE_FILE': Creates, stores and then reads a 30 MB file and measures how long it takes for each of the N artificial end users to be able to respectively see the read-back file on their respective Desktops.

The following Listing 3B illustrates a larger set of workload tasks that may be imposed individually or as combinations by the artificial end users on the targeted resources:

Listing-3B:
File and Folder targeting operations (CRUD stressing, CRUD stands for Create, Read-back what is there, Update Delete)
Registry checking and/or altering operations (CRUD)
Event log checking and/or altering operations (CR)
Allocating, deallocating memory blocks
Copying system memory (e.g., RAM) content from one memory area to another
Starting, adding processor threads to data processing units that operate on a multi-threaded basis
Executing a fixed set of CPU operations, single and multi-threaded
Zipping and/or Unzipping a set of files with varying compression levels
Reading and/or writing image files in various file formats, with and without compression
Encoding and/or Decoding audio and video files
Performing image transformations, like filter, scale, rotate, crop and mask
Performing network I/O operations
Processing of user inputs (keystrokes, mouse inputs, touch inputs, gesture inputs, voice inputs)
Measuring Window/Screen update latencies
Measuring time to start and exercise commonly used applications of different types including:
　Rich text editors
　Image editors
　Spreadsheet processors
　Presentation apps like Power Point
　Video/Audio players
　Web browsers
　Chat/video conferencing applications
Exercising commonly used operations in commonly used apps such as:
　Typing text into input areas (e.g., dialog boxes)
　Copying/Pasting application data
　Opening application files (default or selective open)
　Saving application files
　Searching-for/Replacing identified strings/objects
　Navigating among web sites (e.g., measuring page load times)

One example of how and why local-only stressing would be used for measuring task performance attributes is that system administrators plan to upgrade the client-side local OS's 124 from say, a version 1.1 to a newly-released version 1.2 but before doing so they wish to know what the impact on end user experience will be. So a respective set of EUX measurements are gathered for each configuration and then compared against one another. Another possible reason for stress testing client-side resources is that system administrators plan to replace legacy user workstations with newer laptops but before doing so they wish to know what the impact on end user experience will be. Yet another example is that system administrators plan to add a new application for use by the end users (in this case of FIG. 1C, where the new application will be installed in the client-side) but before doing so they wish to know what the impact on end user experience will be. (More specifically, what the impact would be as compared to not installing that new application at all and/or as compared to installing that new application for execution in remote resources; e.g., in 150 or 160). The client-side-only stressing operations performed by the instantiated artificial end users 105(c) can occur during a maintenance downtime when all human end users (e.g., Usr-1 and Usr-2) are blocked from using the enterprise computer system 100 or it can occur in a so-called live environment settings where human end users (e.g., Usr-1 and Usr-2) are allowed to use the enterprise computer system 100 (e.g., including for running remote sessions) and at the same time the instantiated artificial end users 105(c) constitute a predetermined percentage P of the total, live environment user population; for example 0%<P<100%, or more specifically P is incremented over successive live environment stress tests from 0.1% to 1% to 5% to 10% and to 25% to see what the respective impacts are on EUX for the artificial end users 105(c). In an alternate embodiment, the small subpopulation of artificial end users 105(c) instantiated to operate concurrently with a larger subpopulation of human end users operate as so-called, canaries in the coal mine, as shall be explained in conjunction with FIG. 2B.

Figure 1D:
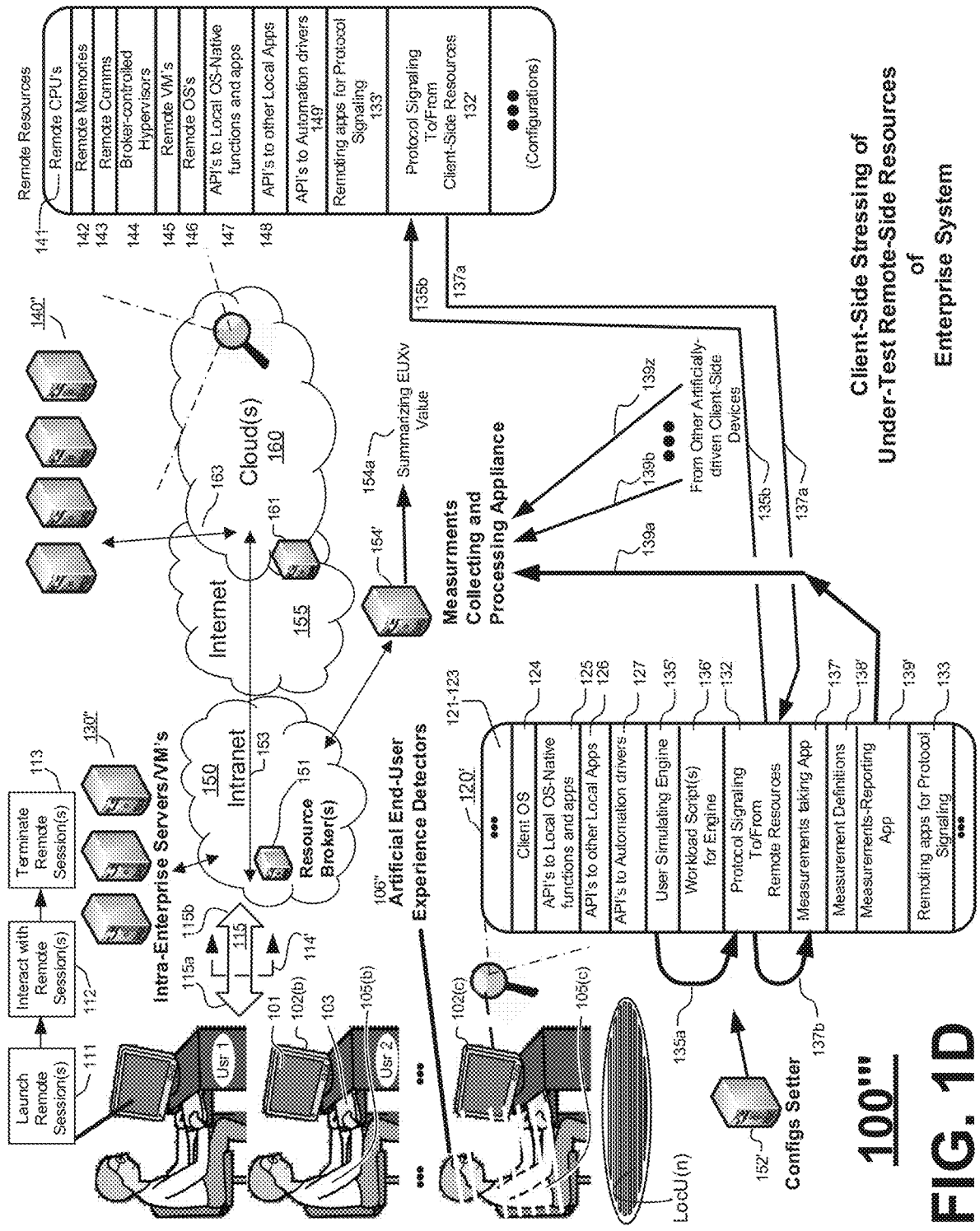
FIG. 1D represents a stressing of each of the first and second enterprise computer systems by means of artificial end users instantiated at the client side of the system where measurements are taken for stress placed on remote side components.
Figure 1E:
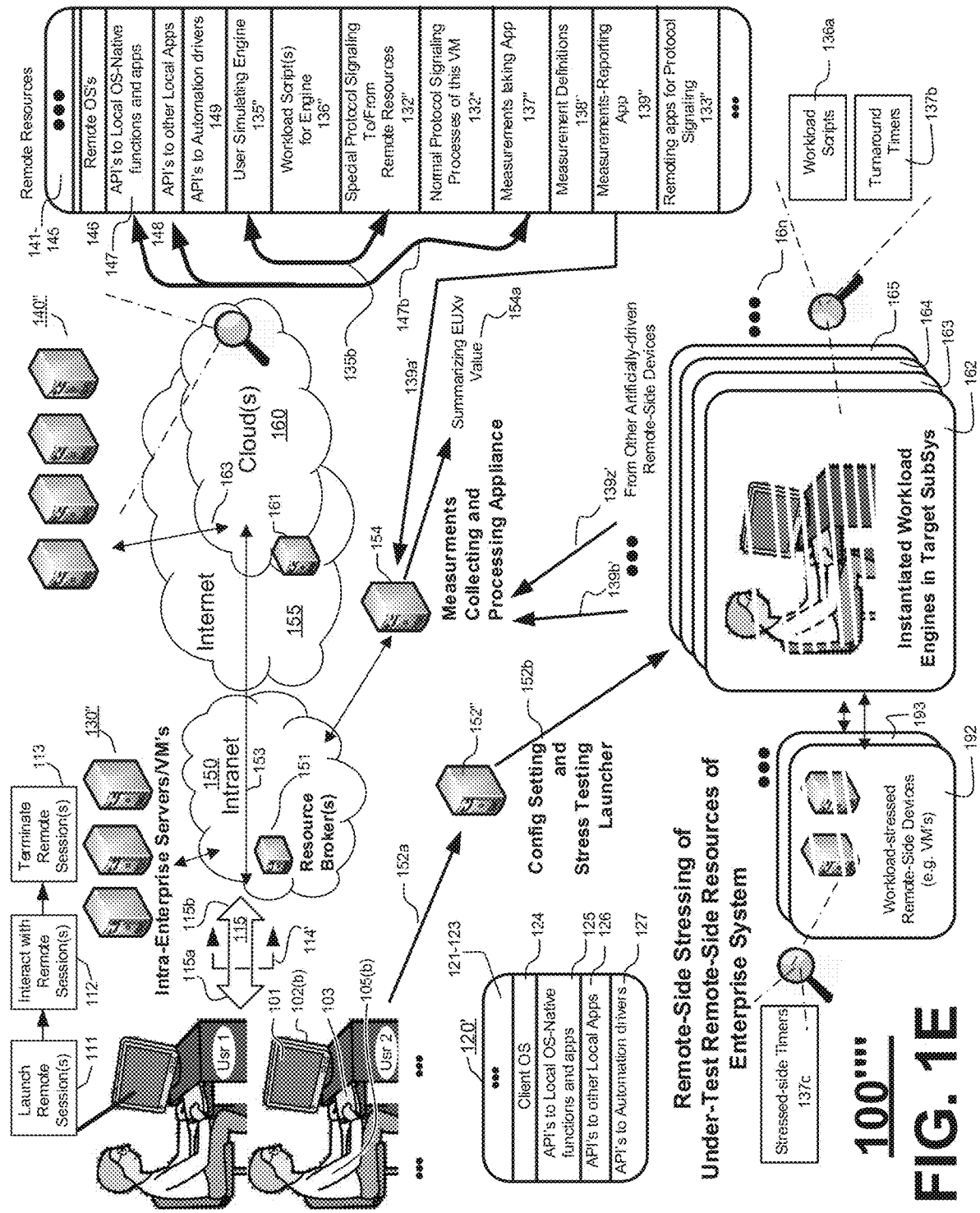
FIG. 1E represents a stressing of each of the first and second enterprise computer systems by means of artificial end users instantiated within the remote side of the system together with respectively instantiated artificial workstations where measurements are taken for stress placed on remote side components.

Although not mentioned in above LISTINGs-3A/B, in one embodiment, the duration-to task-completion measurement threads are structured to have maximum time limits for each kind of attempted task and if the maximums are exceeded, the task is deemed as having failed and a respective failure counter for each is incremented whereafter the task is attempted again in the tested component (a client-side component in the case of FIG. 1C but can be a remote VM in the case of FIGS. 1D-1E). As noted, after task completion success or a predetermined number of failures, the measurements taken for each task requested by each of the N artificial end users 105(c) are collected by respective measurements-reporting apps 139 installed in the respective N client-side physical workstations 102(c) and sent to a centralized measurements collecting and processing appliance 154 (e.g., a server in the enterprise's Intranet) for consolidation. The centralized measurements collecting and processing appliance 154 then generates a performance summarizing EUXv value 154a as shall be explained below.

The exemplary LISTING-3A script can be one of several workload scripts stored into area 136 and then accessed by the corresponding user-simulating engine 136 of the respective physical workstation 102(c). The illustrated configurations setting server 152 operates as a templates distributing server and is used to install same respective engines 135, as well as a same set of workload scripts 136 into each of the to be artificially driven, client-side workstations 102(c). The templates distributing server will install the respective same measurements taking apps 137, measurement definitions 138 and respective measurements-reporting apps 139 so that all the collected results 139a, 139b, . . . , 139z are based on same stressing conditions and same measurement taking procedures. The measurement definitions 138 can define details of how measurements are taken. For example, does the begin of task clock start in response to a key down press event, a return key release event or something else? For example, does the end of task clock stop its count when a new image appears on the display screen 101 of an artificially driven client-side device 102(c) or when a specific event is reported by the local OS 124 or something else? These are nonlimiting examples of the definitions that can appear in the measurement definitions section 138.

In one embodiment, the base workload contains predetermined but non-varying applications similar to native OS applications per the following LISTING-4:

(4a) WordPad_Like_Start: Launches a non-varying custom Wordpad-like () app ( similar to MS Wordpad and having a text oriented user interface, UI, that the simulated user is to interact with)

(4b) WordPad_Like_OpenFile: Opens a dot rtf file (*.rtf) containing pictures (4c) WordPad_Like_TypeText: Operates a virtual keyboard to Type a line of text into the opened file (4d) Paint_Like_Start: Launches a non-varying custom WordPaint-like () app ( similar to MS Paint and having a graphics oriented UI that the simulated user is to interact with)

(4e) Paint_Like_OpenFile: Opens a 4K dot jpg file (*.jpg)

(4f) SystemTimersStart: Starts the user simulating engine (this is an App without a UI that the simulated user is to interact with)

(4g) SysCpuOperations: Perform a mixed set of CPU-only operations in 4 threads (4h) SysSingleCoreCpuOperations: Performs a mixed set of CPU-only operations in a single thread executed by a single one of the cores of a multi-core CPU (4i) SysZipFilesFast: Zips (compresses) a random set of files, using a 'fast' compression setting similar to the native MS Zip function (4j) SysZipFilesHigh: Zips a random set of files, using the 'high' setting (4k) SysCreateLargeFile: Creates a relatively large file (e.g., 900 KB or larger) in the main nonvolatile storage device and then reads the large file into system RAM.

(4L) SysCreateSmallFiles: Creates a large set of relatively small files (e.g., 300 KB or less) in the main nonvolatile storage device and then reads the files into system RAM.

(4m) SysRamOperations: Allocates a predetermined amount of system RAM for itself and then copies into that allocated space data from random blocks of memory.

There are a number of different ways in which measurements can be taken or not taken at the client-side as the stressing activities take place. More specifically, if task start and successful completion takes place in remote resources (in 160 and/or 150, see briefly FIGS. 1D and 1E) then it might not be possible for a client-side measurements taking app 137 to directly determine what the start and stop times are. More will be said about this in conjunction with FIG. 1D. An aspect of the present disclosure is that of being consistent with measurement types for all enterprise configurations that are to be compared one to the other. (See briefly step 230 of FIG. 2 for the comparison step.) The goal is to compare apples to apples using essentially same measurement techniques and not apples to oranges. So if measurement definition calls for an accurate measurement of time it takes for a remote VM to complete a certain task (say, complex arithmetic followed by storage to nonvolatile memory) then the stressing setup of FIG. 1C cannot meet this requirement because its measurements taking app 137 connects (137a) only to the local OS via API's 125 in order to take measurements. A first measurement taking process in accordance with the present disclosure starts an initially zeroed stopwatch in the client-side workstation when a task request/command is submitted at the client-side and via the automation drivers 127 for execution by a client-side resource (e.g., 102(c)). That stopwatch in the client-side is stopped when it is detected one way or another that the tasked client-side resource (e.g., a local hard drive) has completed the requested task (e.g., saving one or more large sized files). One detection method awaits a task completion event report that is generated by the tasked resource(s) and is automatically relayed back to the request originating client-side workstation (e.g., 105(c)). Another detection method captures a task-start timestamp event report that is generated by the tasked resource(s) and is automatically relayed back to the request originating client-side workstation (e.g., 105(c)). The method later captures a counterpart task-successfully-finished timestamp report that is generated by the tasked local resource and is automatically relayed back to the request originating client-side workstation. The difference between the two timestamps constitutes the turn-around time duration. A third detection method automatically repeatedly polls the memory space of the client-side display driver looking for the appearance of specific imagery such as appearance of the above mentioned Paint windows, or the opening of a user input and/or output dialog box or other such local occurrences which indicate that a corresponding event has taken place in the tasked resource(s) and the result has then been relayed back for display or other output by the respective client-side workstation (e.g., 105(c)).

Referring to FIG. 1D, shown here is a setup 100''' where the tasked resource(s) is/are remote rather situated on the client-side. In other words, the tasked resource(s) is/are not directly connected to the task-requesting workstation(s) 102 (c). The illustrated setup has the artificial end users 105(c) still each driving a respective physical workstation 102(c) disposed in the client-side but the requested task(s) is/are to be performed by one or more corresponding resources in the remote-side (e.g., in 150 and/or 160). In such a case, to send task requests to remote resources, each artificial end user 105(c) has to automatically launch a respective remote-session (step 111) at its workstation 102(c). In one embodiment, time for successfully launching the respective remote-session at each respective workstation 102(c) is locally measured and reported (via measurements reporting app 139) to the centralized measurements collecting and processing appliance 154. More specifically, in one embodiment, timestamps of predetermined-as-important login step events, like 'connection established', 'user profile loaded' and 'shell process started' are recorded and compared these to initial timestamps such as the 'connection start timestamp'. The difference between the compared timestamps constitute the respective durations from start to landmark event. In one embodiment, total login time is recorded as the difference between the start of the shell process (usually a command sent to explorer.exe) and the start of the connection. The launching 111 from the client-side workstation of the respective remote-session and the maintaining 112 thereof (including sending task requests to the remote resources) is carried out by use of the local remoting resources 133 which use predetermined protocol signaling processes 132 established for carrying out communications between the client-side workstation 102(*c*) and the remote resources (e.g., in 130" or 140").

Generally, the local remoting resources 133 and protocol signaling processes 132 are pre-installed in each client-side workstation since they are needed for also allowing human users (e.g., Usr-1, Usr-2) to also launch remote-sessions. Accordingly, the configurations setting server 152' does not need to install these. (It is noted as an aside that counterpart remote-side remoting resources 133' (prime) and protocol signaling processes 132' are disposed in the remote resources 140"/130" for interacting with the client-side so that the configurations setting server 152' does not need to install these either.) When launched by the configurations setting server 152', each artificial end user simulating engine 135' in the client-side of FIG. 1D operatively couples to its workload script(s) 136', picks up the listed workload tasks from there (136') one at a time (see again example Listing-3) and sends these as task commands via (135*a*) the protocol signaling processes 132 to a targeted one or more types of remote resources (e.g., a remote CPU alone or CPU plus memory or to the remote resource combinations). (Note that client-side does not know which specific real or virtual CPU(s) has/have been allocated to perform the requested task. It knows the type of resource it is targeting, namely, "a" CPU, "a" memory, "a" VM and so on.) In one embodiment the tasks to be performed are identified via input device interaction with GUI menus. So a desired command may be input by movement of a simulated mouse or simulated user finger to a relative location on a GUI tasks bar, mouse button depression or finger depression on that spot, scrolling to a relative spot on a drop down menu, followed by further selection or activation and so on. The sent task requests move by way of path 135*b* to the counterpart protocol signaling processes 132' in the targeted remote resource(s) and from there to the remote resource(s) that are being targeted by the actions of the simulated client-side user 105(*c*) (e.g., interacting with the GUI instantiated on his/her desktop 101 for the given remotely-hosted work session). In some embodiments the protocol signaling processes 132 in the client-side ask the targeted remote resource(s) to acknowledge receipt of each of the sent tasks. The returned receipt acknowledgements (137*a*) are received by the client-side protocol signaling processes 132 and then detected by the measurements taking app 137' via path 137*b* and recorded by the measurements taking app 137' for subsequent reporting out by the measurements reporting app 139'.

Then, as the tasked remote resources (e.g., remote CPU's 141) try to and/or successfully complete their assigned tasks, the remote-side protocol signaling processes 132' will typically send for-display indication information 137*a* (e.g., the opening of a new dialog or message box) to the client-side requestor. The time of receipt of this for-display indication information 137*a* (e.g., indicating success or failure of the remote operation) plus optionally other attributes that may be extracted from the returned, for-display indication information 137*a* may be used to make measurements.

More specifically, when the remote-side protocol signaling processes 132' sends new or refreshing display information back to the corresponding client-side workstations (via path 137*a*) for display on the client-side display screens 101, the measurements taking app 137' will use artificial intelligence (AI) and/or expert knowledge rules to detect time of display refresh or display change, determine what if anything in the updated display has changed and what that/those changes likely mean (for example that the requested task has completed on the remote side). In addition to that, the AI and/or expert knowledge rules are used in one embodiment to detect changes in display quality (e.g., resolution), changes in input latency and in refresh rates for thereby arriving at inferences as to what is going on inside the remote side and how those aspects may affect end user experience (EUX) 106". More specifically, increases in in input latency, in display update rates and decreases in display quality may indicate current bandwidth constraints in the targeted remote resources and/or communications resources 153 used for returning results.

The measurements reporting app 139' collects the inferences made by the measurements taking app 137' and forwards these to the centralized measurements collecting and processing appliance 154 at suitable times together with identification of the task(s) being measured, identification of how they are being measured and identification of the device(s) which were asked to perform the task(s).

FIG. 1D presented the case where stressing originates from the client-side (from client-side engine 135') and the actual stressing (execution of the workload tasks) occurs in the remote-side while measurements of task turnaround times and failures occurs in the client-side (by measurements taker 137'). Referring to FIG. 1E, shown here is a setup 100''' where the stress-applying workstation(s) is/are disposed in the remote-side and the measurements taker(s) (e.g., 137") are also in the remote-side. Slide 162 represents a first artificial end user and a first artificial workstation both instantiated in a first virtual machine (VM) executing within the remote resources (in either 130" or 140"). The white hash lines through the end-user and workstation in slide 162 indicate these components are virtual as opposed to physical. Magnifier-revealed block 136*a* represents the workload tasks that the first artificial end user passes on through his/her first artificial workstation for stressing one or more targeted devices (e.g., 192) in the remote-side. The one or more targeted devices (e.g., 192) can include the first virtual machine (VM) 162 itself in which the first artificial end user and first artificial workstation are instantiated. The one or more targeted devices (192) can alternatively or additionally include other remote-side virtual machines that are instrumented to report task-turnaround times of components within them (e.g., CPU's, memories, I/O devices). Magnifier-revealed block 137*b* represents a first set of turnaround timers instantiated in the first artificial workstation 162 for taking end user experience measurements as seen from the perspective of the first artificial workstation. In some embodiments, additional turnaround timers 137*c* are instantiated in those of the stressed devices that are not disposed within the first virtual machine (VM) 162 that instantiates the first artificial end user and his/her respective artificial workstation. Although not fully shown, it is to be understood that slide 163 will look the same as slide 162 and thereby represent a second artificial end user and a corresponding second artificial workstation both instantiated in a second virtual machine (VM) executing within the remote resources (in either 130" or 140"). Likewise, slide 193 represents a second set of one or more targeted devices that can include the second virtual machine (VM) 163 in which the second artificial end user and second artificial workstation are instantiated. The one or more targeted devices 193 can alternatively or additionally include other remote-side virtual machines.

More specifically, in the illustrated setup 100''' of FIG. 1E, the configurations setting server 152" is instructed (152*a*) by system administrators to preload a first plurality of N virtual machines (VM's) in the remote side each with an artificial end user simulating engine 135", with corresponding workload scripts 136", and also with a there-localized measurements taking app 137" as well as with measurements definitions 138" and with a measurements reporting app 139". Moreover, the configurations setting server 152" installs special protocol signaling processes 132" into each of the N virtual machines (VM's, those represented by slides 162, 163, . . . , 16*n*). These special protocol signaling processes 132" behave as if they were on the client-side and sending GUI commands to a remote session even though they (162, . . . , 16*n*) are disposed in the remote-side. The normal protocol signaling processes 132* of all stressible remote-side devices (see 132' of FIG. 1D) are also present inside the respective N VM's. The special protocol signaling processes 132" are operatively coupled to the normal protocol signaling processes 132* (see also 132' of FIG. 1D) of their respective VM's to simulate the interaction that happens for example in FIG. 1D between protocol signaling processes 132 (in client-side) and 132' (in remote-side). The artificial end user simulating engine 135" connects (135*b*) to the special protocol signaling processes 132" to simulate a client-side user sending inputs through the client-side, normal protocol signaling processes (see 132 of FIG. 1D) to a counterpart remote-side, normal protocol signaling processes (see 132' of FIG. 1D). In FIG. 1E, the special protocol signaling processes 132" added in by the configurations setter 152" forwards its inputs received from engine 135" (e.g., GUI inputs from the artificial user such as cursor movements and button or touchscreen depressions) to the tasked normal protocol signaling processes 132* of the tasked resources (not shown, but more instances of normal block 132* will also be disposed in the additional VM's 192, 193, . . . , besides being in the first plurality of N VM's that simulate the N artificial users and their N respective artificial workstations (162, 163, . . . 16*n*)).

In other words, even though the simulated N artificial users and their N respective artificial workstations (162, 163, . . . 16*n*) are disposed in the remote-side (and optionally some of the workload-stressed resource(s) 192, 193, . . . , etc. are also disposed in the remote-side but in different VM's), communications between them when simulating a remote work session are not direct but rather go (see path 135*b*) through the special protocol signaling processes 132" for receipt by the counterpart and normally already-there protocol signaling processes 132*.

On the other hand, because the measurements taking app 137" is located in the remote-side and more specifically, in the same VM that hosts the workload-stressed resource(s) as well as the stress creator 162/135"; the measurements taking app 137" is directly connected to hook into (via path 147*b*) the OS's 147 of the workload-stressed resource(s) for thereby taking direct measurements of task performances occurring in the workload-stressed resource(s) under control of the OS's 147. The measurements taking app 137" of each of the simulated N artificial users and their N respective artificial workstations (162, 163, . . . 16*n*) in FIG. 1E can also hook into the API's 148 of non-native applications installed in its VM for collecting task performance reports output by those non-native applications. Although not shown in FIG. 1E, in some embodiments, the measurements taking app 137" of each of the simulated N artificial users and their N respective artificial workstations (162, 163, . . . 16*n*) in are also coupled to the special protocol signaling processes 132" of the respective pair of simulated users and simulated workstation (e.g., 162) for detecting the display information returned to the simulated workstation via their normal protocol signaling processes 132*. Thus the measurements taking app 137" of FIG. 1E can take in two kinds of measurements; those based on event reports that are picked up directly from the OS's and/or from the non-native applications of the tasked resources as event reports (e.g., task-started, task paused, task error encountered, task completed) and those that are based on information inferred from display information sent to the artificial end user's workstation from the remote session manager (e.g., new Paint window opened, new dialog box created, previous window now no longer displayed).

The centralized measurements collecting and processing appliance 154 of FIG. 1E receives and collects for analysis the measurement reports provided by the measurements reporting apps 139" of the respective plurality of instantiated artificial end users and their corresponding artificial workstations as indicated by data collecting paths 139*a'*, 139*b'*, 139*z'*. The provided measurement reports include appropriate identifications of the requested tasks, of the device(s) asked to perform those tasks and of the artificial end users and/or corresponding workstations from which the requests were issued. The reports will not all be identical because each instantiated artificial end user and corresponding artificial workstation (e.g., 162) can be subject to different environmental conditions. For example, the physical server in which a first pair of artificial end user and corresponding artificial workstation (e.g., 162) are instantiated can encounter data processing challenges (e.g., traffic congestions; temperature variations; power supply variations) that are not encountered by another physical server in which a second pair of artificial end user and corresponding artificial workstation (e.g., 163) are instantiated. Thus a statistical spread is expected for the collected measurements.

Task turnaround measurements can be taken for a variety of basic or compound operations taking place at the tasked resources end. Measurements of basic operations may include how long it takes for a tasked CPU 141 to execute a given arithmetic or binary operation a predetermined large number M, of times (e.g., M=10 million). Measurements of compound operations may include how long it takes for the task-burdened resources (e.g., 141-143) to execute the complex subtasks of an OS-native application (e.g., WordPad, Paint reached via API's 147) and/or of a non-native application (e.g., reached via API's 148). Task duration may vary depending on various factors including, but not limited to, the amount of input data that needs to be processed (e.g., megabytes versus gigabytes versus terabytes); the amount of input data that needs to be generated and communicated to a destination (e.g., a remote or client-side data storage device); interjection of other, higher priority tasks that are to be carried out by the same remote resources that are performing the duration-measured, stressing task; occurrences of recoverable errors in the remote resources (e.g., an ECC fault detection) where the error infected subtask can and is repeated; and so on.

Stress-testing in accordance with the present disclosure is not limited to execution of OS-native functions and OS-native applications at the remote resources side 114'. The contemplated alteration of the enterprise computer system may include that of introducing a new application to be executed somewhere within the enterprise computer system, be it in the client-side 115a or in the Intranet portion 130 or in the in-cloud resources 140. For such cases, the workload driving scripts 136 (in FIG. 1C) or 136' (in FIG. 1D) or 136" (in FIG. 1E) will call for various functions to be executed by the new application as well as optionally also stressing the system with OS-native operations to see how the new application mixes with legacy operations.

In general we could mention anything that might influence performance and end user experience of the client user.

The introduction of a new application is merely one example of possible alterations to the enterprise computer system that would call for comparative stress testing to determine end user experience (EUX) before or after the alteration. Further examples include, but are not limited to those in LISTING-5:

Listing-5: (Alterations)
  (5a) Changes in hardware setup (CPU, GPU, Motherboard, RAM, Storage, networking, power management)
  (5b) Changes in security on the OS and/or Hypervisor Virus scanners, virtualization security TPM chips
  (5c) Software Updates to the Hypervisor
  (5d) Updates/Patches of the OS
  (5e) Updates/Patches of the enterprise applications
  (5f) Updates to the remoting protocols/clients
  (5g) Switching from use of one protocol to another
  (5h) Changing protocol settings
  (5i) Changing display resolution
  (5j) Changing OS and/or application configurations
  (5k) Switching between the following setups:
    (5k.1) VDI solution
    (5k.2) SBC solution
    (5k.3) Non virtualized configurations (Laptop, Nuc, desktop etc.)
    (5k.4) In-Cloud implementation
    (5k.5) On-premises implementation
    (5k.6) Changes in communications network configurations
    (5k.7) Changes in networking hardware
    (5k.8) Changes in workload (change/add Enterprise apps)
    (5k.9) Changes in number or types of concurrent users For sake of consistency, the physically real or virtual workstations that submit workloads for execution by the to-be stress-tested resources should all submit substantially same workloads. For sake of consistency, the measurement taking processes that measure the various types of turnaround durations (e.g., as reported by an OS, as reported by an app, as inferred from changes in to-be-displayed desktop information) should all be the same. This should apply whether there are 10 stress creating users (real or virtual) or 100 such users or thousands and beyond. The client-side only stressing approach of FIG. 1C has many drawbacks in this regard. One is that a large number of physical client-side workstations (say hundreds or thousands) may have to be commandeered to test for stressing results when the number N of artificial end users is to be incremented (scaled up). The client-side stress-originating approach of FIG. 1D has the same drawback. Another drawback is that task duration takes place mostly at the remote-side while duration measuring is taking place at the client-side mostly by way of inferences drawn form the to be displayed desktop information, this meaning that communication latency will affect the results depending on how the duration measurements are carried out. By contrast, the remote-side only stressing approach of FIG. 1E overcomes these problems. One drawback is that it does not see the last-mile effects of the communications fabric portion 115 that links the real client-side workstations to the Intranet 150 and/or clouds 160. Advantages of the stressing approach of FIG. 1E include its ability to commandeer any desired number of remote-side VM's (as constrained by brokering limits) for implementing its N pairs of artificial end users and corresponding artificial workstations (e.g., 162, 163, . . . , 16n). Another advantage of the stress-testing approach of FIG. 1E is its ability to take measurements (e.g., task turnaround times, task failure rates) based on reports obtained directly from the task-controlling OS's, hypervisors or applications (see for example, reports pickup path 147b). Another advantage of the stress-testing approach of FIG. 1E is its ability to also take measurements based on inferences made due to changes in the display information that is to be presented on the not-actually-there displays of the artificial workstations (e.g., those of 162, 163, etc.). Another advantage is that the not-actually-there displays do not consume power.

In one embodiment, the rich panoply of different kinds of task turnaround times and of success/failure reports are relayed back to the centralized measurements collecting and processing appliance 154 together with identifications of the specific remote devices (e.g., VM's) under test, and identifications of the specific remote devices that implemented the corresponding N pairs of artificial end users and corresponding artificial workstations (e.g., 162, 163, . . . , 16n) as well as specifications of other attributes of the specific remote devices (e.g., OS version number, Hypervisor version number, display resolution being simulated, physical host name, etc.)

Figure 2A:
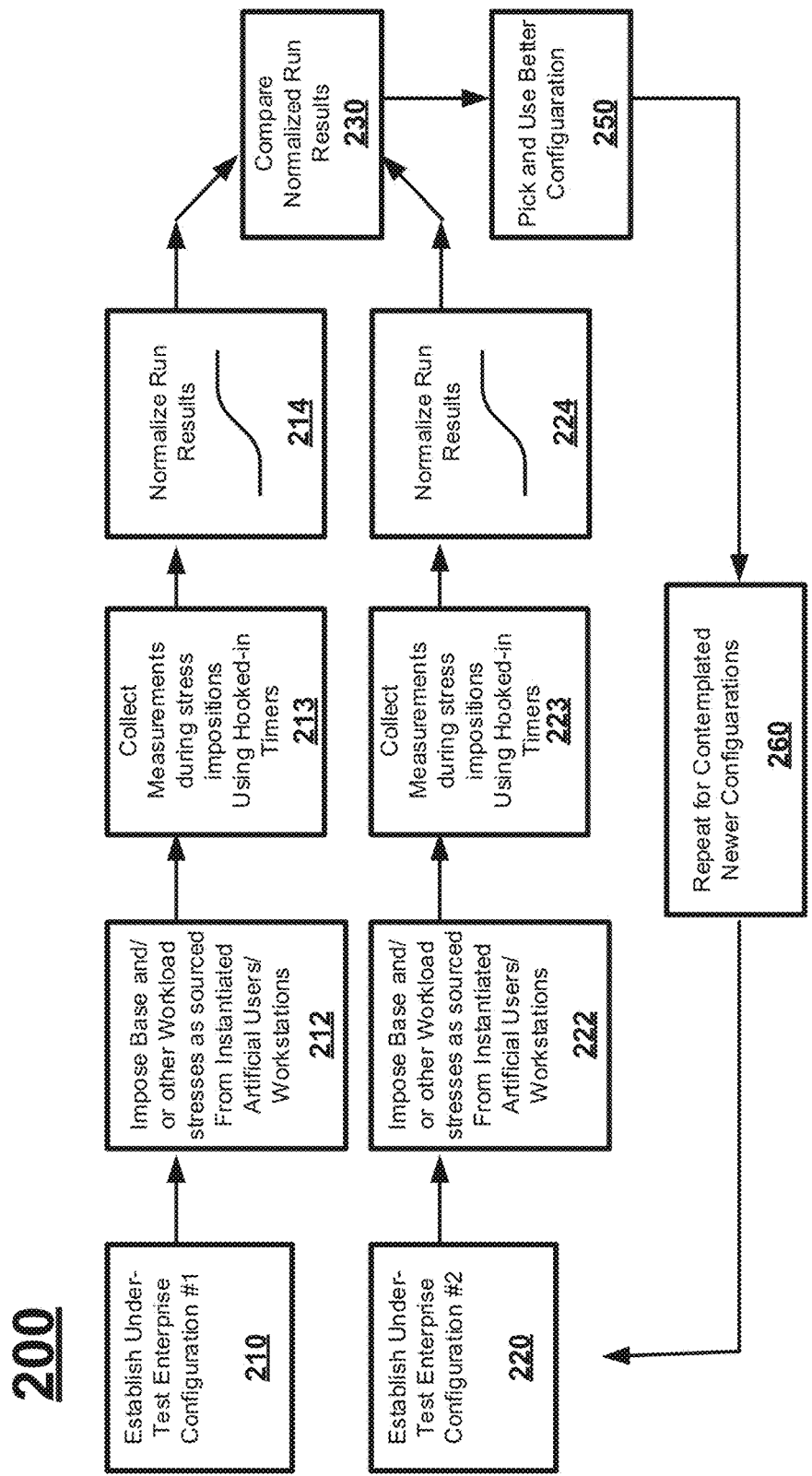
FIG. 2A depicts comparative workload stressings of the first and second enterprise computer systems by means of instantiated artificial end users and substantially same workloads where determination of preferred enterprise configurations is based on the comparing measurements resulting from the substantially same workloads.

Referring to FIG. 2A, a high level depiction is provided of a configurations comparison process 200 in accordance with the present disclosure. Parallel tracks are established for a first configuration 210 of the enterprise computer system and a different second configuration 220. At respective blocks 212 and 222 of the parallel tracks the respective first and second configurations are stress tested (not at the same time of course) by running simulations of the corresponding artificial end users imposing respective and substantially same workloads (e.g., the invariant base workload tasks plus optionally using a new enterprise-wide application) on the respective first and second configurations. Measurements are taken and recorded as the simulations run. The taken measurements may include one or more of: (a) measuring application UI-input to application pickup delay time (also more simply denoted as 'UI latency'); (b) measuring thread creation request to begin of thread execution delay time (also more simply denoted as 'CPU latency') and (c) storage-request to begin of storage operation delay time (also more simply denoted as 'Disk latency'). More specifically, the UI latency stopwatch is started when the corresponding artificial end user begins inputting data (e.g., typing text, drawing a geometric shape) into the user interface window of the under-stress application (e.g., text processing app, graphics processing app) and the stopwatch is stopped at the time a report is received that the under-stress application has started processing the user input. The CPU latency stopwatch is started when the corresponding artificial end user begins sending an operation-create request to a CPU (real or virtual) of the system (e.g., an arithmetic job) such that a corresponding thread is created and the stopwatch is stopped at the time a report is received that the targeted CPU has picked up the thread as one of the threads the CPU is currently processing, for example on a multitasking basis. The Disk latency stopwatch is started when the corresponding artificial end user begins sending a storage request (e.g., read or write) to a nonvolatile data storage device (real or virtual) of the system and stops the stopwatch at the time a report is received that the targeted storage device (e.g., magnetic disk, optical disk, solid state storage—a.k.a. SSD) has begun performing the requested storage task (e.g., read or write a relatively large amount of data). The stopwatch start and/or stop actions may occur at the end of one or both of the request/perform actions instead of both at the beginnings of the request/perform actions. Instead of using the stopwatches approach, timestamps may be recorded and the differences between the respective timestamps computed as constituting the measured latencies.

The types of task performance attributes that are measured are not limited to the above latency examples. The types of taken measurements can be varied depending on which of the respective stressing approaches of FIGS. 1C, 1D and 1E are used. In the case of FIG. 1C only client-side resources can be stressed. The measurements can be based on hooks 137a into the event reporting facilities of the local OS's and local applications 125/126. In the case of FIG. 1D, the measurements may have to rely on inferences reached based on protocol provided information (e.g., changes to the imagery in the remote session window) returned by path 137a. In the case of FIG. 1E, a wide variety of different kinds of measurements can be taken because both the hooks to the local OS's 147 and local apps 148 are available to the measurements taking application 137" as well as the protocol provided information (e.g., changes to the imagery in the remote session window) returned by the normal protocol signaling processes 132*.

At respective blocks 213 and 223 of the parallel tracks shown in FIG. 2, the measurements taken in respective blocks 212 and 222 are collected for centralized analysis, for example by the centralized measurements collecting and processing appliance 154. Specifics of the analysis are described below with respect to FIG. 4.

Part of the analysis includes normalizing initial calculation results (e.g., measured latencies) to account for how real human beings experience different kinds of task turnaround times. Part of the normalization includes giving different degrees of confidence to different kinds of task turnaround times based on their adherence to expected statistical attributes (e.g., mean, median, skew). This is represented by respective blocks 214 and 224.

More specifically, in one embodiment, the following inflection point (nominal), case switchpoints (good, bad) and weight parameters are used per Table-1:

TABLE 1

| Row | Timer | nominal (ms) | good (ms) | bad (ms) | weight |
|---|---|---|---|---|---|
| 1 | WordPadStart | 472 | ≤250 | ≥896 | 0.75 |
| 2 | WordPadOpenFile | 450 | ≤219 | ≥850 | 1.0 |
| 3 | WordPadTypeText | 900 | ≤200 | ≥2000 | 0.0 |
| 4 | PaintStart | 503 | ≤186 | ≥995 | 1.0 |
| 5 | PaintOpenFile | 501 | ≤328 | ≥681 | 1.0 |
| 6 | SystemTimersStart | 97 | ≤46 | ≥196 | 1.0 |
| 7 | SysCpuOperations | 1234 | ≤760 | ≥1697 | 0.75 |
| 8 | SysSingleCoreCpuOperations | 1165 | ≤731 | ≥1534 | 0.75 |
| 9 | SysZipFilesFast | 3400 | ≤1781 | ≥6444 | 0.75 |
| 10 | SysZipFilesHigh | 5467 | ≤2776 | ≥8657 | 0.75 |
| 11 | SysCreateLargeFile | 570 | ≤213 | ≥1544 | 0.75 |
| 12 | SysCreateSmallFiles | 535 | ≤221 | ≥1135 | 0.75 |
| 13 | SysRamOperations | 923 | ≤450 | ≥1812 | 0.75 |

These Table-1 parameters may be changed based on experience (e.g., manual decision making and/or machine learning based optimization). In one embodiment, an expert rules knowledge base or a trained artificial intelligence agent is used to automatically pick the weights and/or inflection and switchpoints (points on the saturation function) based on how close to expectations are the statistical attributes of the collected raw data. The Table-1 values are merely examples. Other examples of nominal values may include a nominal value of 150 ms for each keyboard input, a nominal value of 500 ms for each mouse input and a nominal value of 1 second for each operation that results in a window (e.g., dialog box) being opened or another major UI change event taking place. The weights do not change on a per stress-run basis and instead are kept constant over a statistically significant number of stress tests are run and sufficient experience is collected for deciding to then adjust the weights based on experience. The EUXv summarizing value may be computed in steps per the following algorithms:

EUXv (step 1) compute:

sum_weighted_average=0 sum_weights=0 for timer.name found in timer results sum_weighted_average+=timer.index*timer.weight sum_weights+=timer.weight performance index=sum_weighted_average/sum_weights In step 2 the comprehensive EUXv final value accounts for not only the time duration measurements, but also the success versus failure rates statistics of the applications and of the remote sessions in accordance with the following Step 2 algorithm:

App Execution success rate=successful app executions count/total app executions count Session success rate=successful session running time/intended total session running time Finally by combining steps 1 and 2 we get:

EUXv=EUX Index=EUX Performance Index*App Execution success rate*Session success rate As noted above, the comprehensive (but not yet normalized in one embodiment, or already normalized in another embodiment) EUXv value accounts, in one embodiment, for application success versus failure rates by dividing the total number of successful app executions by the total number of app executions. In an alternate embodiment, rather than just accounting for success of full applications, the success rates of tasks within the applications may be accounted for by dividing the total number of successful task completions by the total number of attempts at performances.

Also as noted above, the comprehensive (but not yet normalized in one embodiment, or already normalized in another embodiment) EUXv value accounts, in one embodiment, for session run successes versus failed sessions. For this, the EUX calculator engine analyzes all the session launch attempts of the artificial users. For each of the session launch attempts, the EUX calculator engine knows when the session was started and it knows the total intended runtime of the session (until the end of the stress testing). If the session failed by not running for the total intended runtime, the engine compares the actual runtime of the session with the intended run time to get to the success rate of that session. If the login failed, its success rate will be zero.

In one embodiment, the EUXv value and its associated statistics are recomputed on the basis of a forward advancing time window, where in one example the window is 4 minutes wide. The collected raw data is held in a so-called, bucket for respective sample time t:

bucket(t)=data where data.time_stamp between(t−4 minutes) and (t+4 minutes

In the above formula 'data' means anything of interest for the EUX index computations. For example, the data of interest can include timer results (based on their time stamps), application execution successes and failures for applications that were running at that time and session successes and failures for sessions that were supposed to be running at that time (be it that they were or not). For session success rate, we divide the total time the session ran during our time range divided by the time the session should have run inside the time range. This means that if a session fails before the start of our time range, it is counted as zero in its 'all-sessions-sum' calculation and it will be included in the total session count. If a session started after our time range ended, it is not counted. If a session started half way through our time range, we use the time it fell within our range as the intended run time and count it as 1 in the total session count. For app success rate, we use the app executions that have any part of their running time overlap with the time range. (Each advancing-window crossing one of the app executions will count as a successful '1', irrespective of the time it overlaps for simplicity.)

The raw measurements source data is retrieved by taking all EUX timer results from either the entire test run or a predetermined time range within the test run. In both cases the response times of each timer are accumulated and then the top 10% boundary values are taken as the response times to be used as inputs in the following:

response_time=response_times.sort_ascending( ).element_at(response_times.length*9/10)

After the above raw data points are collected, the inputs are normalized to account for human insensitivity to extreme goods and bads by using a respective dual ended saturating transform function to get to a 'normalized performance score' for the respective timers. Each timer has tuning parameters for its 'nominal', 'good' and 'bad' result (response times). The performance score of timer 't' is determined in one embodiment, by the following classification algorithm which distinguishes as between bad and good results with the set nominal value being the divider between the two ranges:

if response_time(t)>nominal(t)
Then if the duration exceeded the timer nominal, this will be a "bad" score. How bad is it, is determined relative to the 'bad' switchpoint score of this timer performance_score(t)=−100*(response_time(t)−nominal(t))/(bad(t)−nominal(t))
else
Otherwise if the duration was less than nominal, this will be a "good" score for the timer. How good is it, is determined relative to the 'good' switchpoint score of this timer performance_score(t)=100*(nominal(t)−response_time(t))/(nominal(t)−good(t))

In one embodiment, the performance score of each timer is generally kept within a non-saturated range of say, stays between −100 and +100 for nominal speed tasks. However, for really fast or slow tasks, the performance scores could fall outside of this range. Mathematically speaking, the pre-normalization score can run from negative infinity to positive infinity. However, at both extreme ends of the spectrum getting faster of slower will not make much of a difference to human end users. To reflect this reality, the normalizing transform function is re-mapped from the infinite range to a finite range of say, between zero and 10 inclusive using a formula such as the following:

$$f(x) = \frac{10}{1 + e^{\frac{-(x+100)*1.3}{100}}}$$

As will be appreciated, the denominator of the f(x) function remains positive and ranges between 1 and infinity. Thus the given f(x) function ranges between appropriately zero (rounded to zero) and ten. The parameters in the transform may be changed to provide different switchpoints for what will be considered, "bad", "good" or nominal performance.

In block 230, after each of run chains 210-212-213-214 and 220-222-223-224 have completed, the normalized run results are compared. In one embodiment, a respective single summarizing value, EUXv1 is generated for the first run chain and a respective single summarizing value, EUXv2 is generated for the second run chain. In one embodiment, each of EUXv1 and EUXv2 is constrained to the range of zero (0) to ten (10) inclusive. In subsequent block 250, the greater of EUXv1 and EUXv2 is selected as indicating the better solution. If there is a tie, the older of the two configurations is kept under the theory of avoiding un necessary alterations to the system. In block 250, the chosen configuration is used by the enterprise computer system and the stress-test results predicted by the corresponding simulation run (those of 213 or 223) are compared to live environment results in order to validate the stress-test process.

As time proceeds, more alterations to system configuration are contemplated per block 260 and the more recent contemplations are analyzed by running chains 210-212-213-214 and 220-222-223-224 for the newer configurations.

Figure 2B:
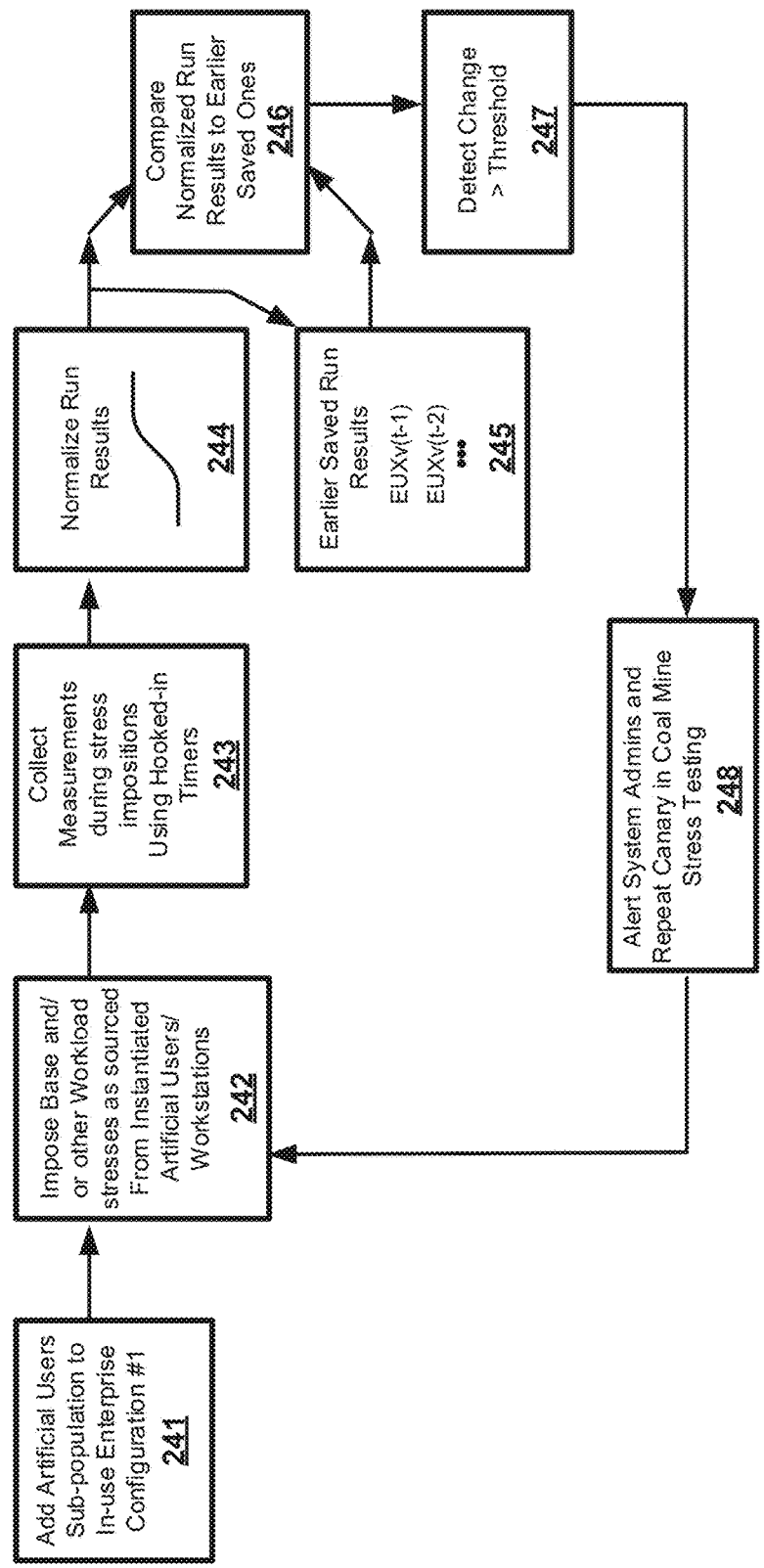
FIG. 2B depicts a canary-in-the-coal-mine monitoring system in which a relatively small part of the user population of a live running environment is constituted by artificial end users whose end user experiences are automatically repeatedly monitored and in which changes to their simulated end user experiences that cross predetermined thresholds cause alarms to be sent to system administrators.

Referring to FIG. 2B, shown is a so-called, canary-in-the-coal-mine configuration 240. A relatively small sub-population of artificial end users are instantiated in a live run environment otherwise populated by a majority of human end users (step 241). The EUX detecting capabilities of the relatively small sub-population of artificial end users are used to detect alarm-worthy changes or trends in the task performance attributes of the monitored system. The relatively small sub-population of artificial end users may constitute 5% or less of the total user population that includes human end users. In one embodiment, the relatively small sub-population of artificial end users may constitute 1% or less of the total. In another embodiment, the relatively small sub-population of artificial end users may constitute 0.1% or less of the total.

Step 242 adds the system stressing workloads of the relatively small sub-population of artificial end users to the overall system workloads while measuring the corresponding task performance attributes (e.g., turnaround times, task success/failure rates, session success/failure rates).

Step 243 collects the measured task performance attributes during the imposition of system stressing workloads so that they could be combined for a given advancing time window to determine the EUXv values for the respective artificial end users.

Step 244 is optional and transforms the raw EUXv values into normalized ones for example those limited to the range zero to ten inclusive (|0-10|). As the normalized EUXv values are generated for each advancing time window they are saved for later reference in step 245.

In step 246, the canary test 240 compares the latest run results of the artificial end users with the saved earlier ones store in block 245 (e.g., EUXv(t−1), EUXv(t−2), etc.).

Step 247 detects changes that exceed predetermined thresholds. The detected changes may account simply for the latest result versus the most recent previous one or for the latest result versus a weighted average of a plurality of N most recent previous ones where the weights decreasing for the more aged results. In one embodiment, The detected changes also account for changes in trending, for example by detecting the slope versus time of changes for a plurality of N most recent results.

Step 248 automatically alerts one or more system administrators (more or higher up in a hierarchy for more severe threshold crossings) if and when the detected changes exceed the predetermined thresholds. Irrespective of whether alerts are issued or not, control loops back to step 242 so as to automatically repeatedly perform steps 242 through 248 and thus continuously monitor system performance based on the detected end user experiences of the relatively small sub-population of artificial end users, where the latter serve as the small canaries in the relatively large coal mine so to speak.

Figure 3:
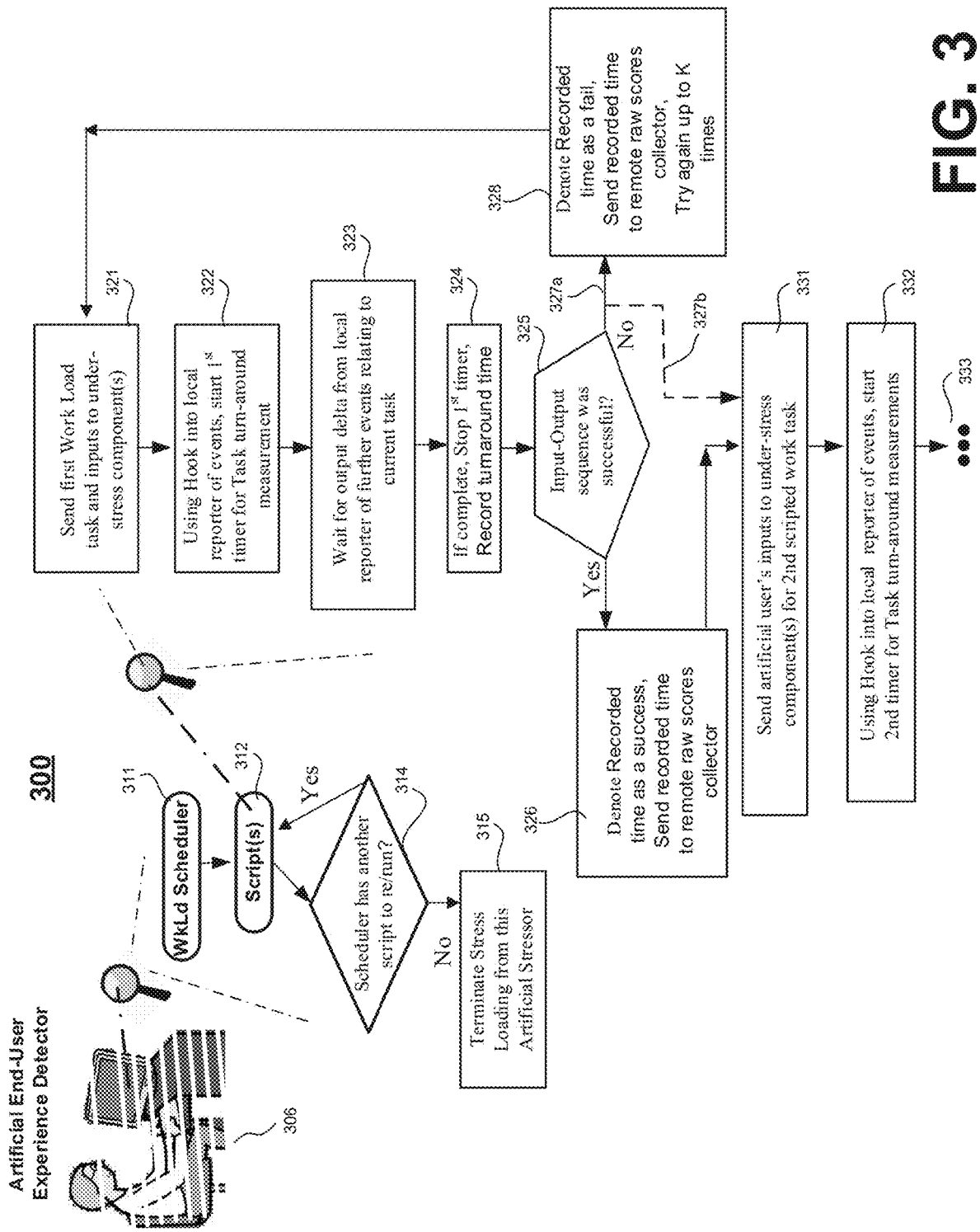
FIG. 3 shows how turnaround measuring timers may be hooked into local reporters of events taking place remotely or locally.

Referring to FIG. 3, shown is a flow chart 300 for a measurements taking run for the case of FIG. 1E. An example pair of artificial end user and corresponding artificial workstation is shown at 306 functioning as a EUX detector. The artificial workstation has a workload scheduler 311 instantiated therein. The scheduler 311 selects workload scripts 312 stored in the artificial workstation one at a time according to a predetermined order. Step 314 determines if there are more scripts to run. If the answer is no, step 314 terminates the stressing session and informs the centralized measurements collecting and processing appliance 154 that the run has completed.

The magnification into one of the scripts shows that the execution of the script includes a first step 321 in which a first workload task is sent to a to-be-stressed enterprise resource or combination of resources. In a subsequent step 322 a measurements taking app (e.g., 137" of FIG. 1E) that is hooked into a local events reporting source (e.g., 147/148 of FIG. 1E) waits to receive a report that the first workload task has been started in the tasked resource(s) according to the local events reporting source. In response to the report, a first stopwatch timer is started for determining task turnaround time.

At further step 323 the measurements taking app is waiting for a subsequent indication form the local events reporting source as to whether the task has successfully completed or otherwise run into some sort of problem. At step 324, if successfully completion is indicated, the first stopwatch timer is stopped and its reading is recorded as the task turnaround time for the corresponding task. The present teachings are not limited to using stopwatch-types of duration measuring means. Timestamps can be used. Plural duration measuring means can be used for measuring different kinds of time periods including latency between when the task is submitted in step 321 and acknowledged as received in step 322. Other time periods that may be measured include lengths of pauses while the task is being performed or time until the local events reporting source indicates that the task has failed and needs to be restarted (unless of course a predetermined maximum time for completion is exceeded).

At step 325 it is determined whether all the inputs necessary for completing the task have been acknowledged by the tasked resource(s) and whether all the outputs expected to be produced by the tasked resource(s) have been indicated as produced and/or saved. If yes, control passes to step 326 where the task turnaround time for success is denoted as the task turnaround time for success and sent to the centralized measurements collecting and processing appliance 154 along with any other taken measurements and identifications of the involved system components (e.g., identification of the stress applying workstation 306 and of the task-stressed resource(s). If step 325 indicates a failure, then in one embodiment (327a) control passes to step 328 where the taken measurements are identified as belonging to a failure and are sent to the centralized measurements collecting and processing appliance 154 along with identifications of the involved system components. A decision is made as to whether to try and repeat the task again up to a predetermined number of K times, and if yes, control returns to step 321. If no, then in one embodiment (327b) the failure is recoded but no retry is attempted, instead control is advanced to step 331 for attempting an unrelated second scripted workload task.

As indicated at steps 331-332 and onward (333), the process of steps 321-328 is repeated for a scripted second task and using one or more of second stopwatches or other forms of duration measuring means.

Figure 4:
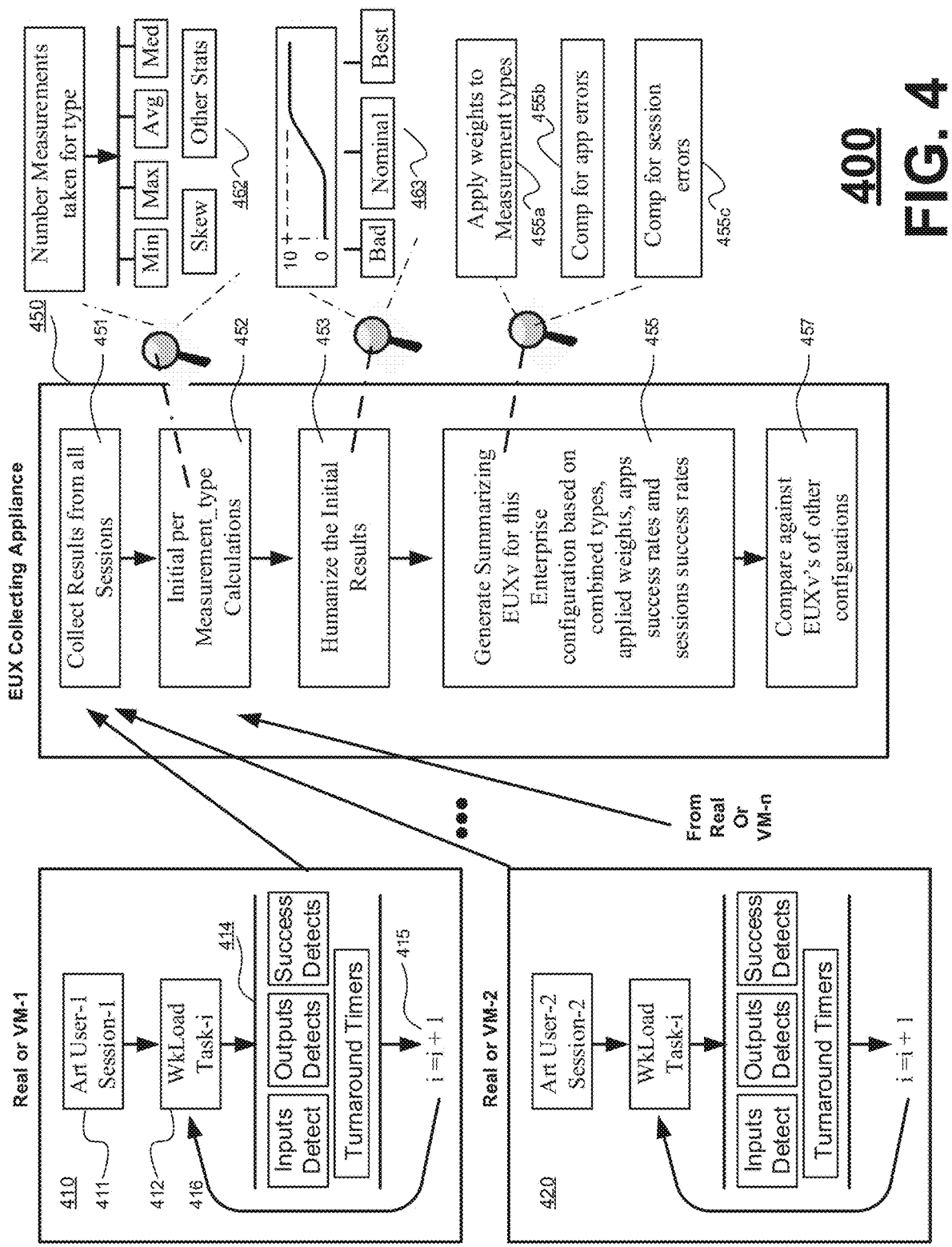
FIG. 4 depicts the system and process for developing final EUXv values for different configurations of the enterprise computer system such that the different configurations can be compared on an apples versus apples basis.

Referring to FIG. 4, show in schematic 400 area plurality of real or virtual EUX workload appliers and virtual experience detectors 410, 420, . . . , 4n0 each of which applies a respective but substantially same workload to its current workload receiving session (e.g., a remotely-hosted session). In terms of more detail, the first real or virtual machine (e.g., VM-1) 410 instantiates a first artificial end user 411 operating a corresponding workload-applying session (e.g., a remotely-hosted session). The instantiated first artificial end user 411 activates its copy of the common workload tasks 412. More specifically, an index i, is initialized at a start value (e.g., i=1) for selecting a first Task-1 in the workload collection (e.g., script(s) and submitting it to the to-be-tasked system resource(s). In block 414, event occurrences and their times of occurrence are detected and recorded. The event occurrences may include acknowledgements of receipt of input signals by the to-be-tasked system resource(s), reports of output signal productions by the to-be-tasked system resource(s), and indications of successes or failures (or pauses, delays) from the tasked system resource(s). Task turnaround times are measured by respective stopwatches or other duration measuring means instantiated in the respective real or virtual machine (e.g., VM-1) 410. The index i, is incremented at 415 and control is returned via path 416 until all planned workload tasks have been attempted. Stress-applying machines 410, 420, . . . , 4n0 (where n can be 10, 100, 1000 or any suitable whole number) can run concurrently including simultaneously or in staggered overlapping fashion depending on how the stress test is designed.

The EUX measurements collecting and analyzing appliance 450 (e.g., 154) is separate from the stress-applying machines 410, 420, . . . , 4n0 and collects their respective measurement reports for analysis on individualized and collective bases. Block 451 collects and saves the raw results received from all the workload sessions of the artificial end users. Block 452 automatically performs initial statistical analyses on a per-type of measurement basis. The analyses includes determining how many measurements have been received for each type of measurement (e.g., communication latency, task completion time length, task pause lengths, etc.). This provides information for how statistically reliable the results are. The per-measurement-type analyses further determine a maximum duration (Max) among the values collected for the type (e.g., maximum task turnaround time), a minimum duration (Min) among the values collected for the type, a median value (Med), an average value (Avg) as indicated at 462. A values distribution (between Min and Max) analysis is performed to determine if the collected measurements of the given kind have their members distributed with respect to populating the values as expected (e.g., according to a normal Gaussian distribution function). If not, the amount of skew away from the expected distribution is determined. Other analysis functions may include filtering functions. In one embodiment, for each set of time duration measurements for a given type of measurement, the measured durations are sorted in ascending order such that the last measured duration in the list is the worst (the longest). Then a slightly less than worst measured duration in the list (rather than the absolute worst) is picked as being representative of a more typical bad result. This picked, slightly less than worst measured duration (a filtered result) is incorporated into the EUX calculation to reflect the typical among the worst results. In one embodiment, the result immediately below the 90% better results is picked as the slightly less than worst measured durations. In other words, the sample is taken at the 9/10th position in the sorted list. It is within the contemplation of the disclosure to use other positions in the list as sample points, for example one at the 8/10th position in the sorted list. Aside from, or in addition to using one or more of relatively worst sample points in each sorted list (e.g., among the lower 50%) as inputs into the EUX calculation, it is within the contemplation of the disclosure to use as further inputs: the Average value for the list, the Median value in the list; the Minimum (best) value in the list, the Maximum value (worst, longest duration) and the Standard deviation of the list.

At block 453, the per measurement-type results are humanized. what this means is that differences between certain values for each respective type are don't matters for human beings. For example, if some of the task turnaround times for displaying a result to a human end user are 0.20 second and some are even shorter, say 0.10 second or 0.01 second, it doesn't matter to the human end user. All are equally excellent or best as far as the human end user is concerned (e.g., less than 0.5 second). Similarly, if some of the task turnaround times for displaying a result to a human end user are 10 seconds and some are even longer, say 20 seconds or 200 seconds, it doesn't matter to the human end user. All are equally unacceptable or bad as far as the human end user is concerned (e.g., greater than 2 seconds). Accordingly, a transformation function is applied to the results as indicated at 463 where the transformation function saturates at its extreme low and high ends. In one embodiment, irrespective of type of measurement, the respective per-type of transformation function saturates at a value of ten (10) for the results that a normal human would deem as best and at a value of zero (0) for the results that a normal human would deem as unacceptable or bad. Results that fall between the normalized minimum and maximum values of zero and ten are deemed as nominal and are provided to a finite rounded-down precision of no better than three digits, say between 0.01 and 9.99. More preferably, the normalized nominal results are provided to a finite rounded-down precision of no better than two digits, namely, between 0.1 and 9.9. This way a human administrator can easily determine just by looking what the relative goodness of each normalized result is.

With respect to subsequent step 455, some measurements for respective types of measurements will turn out to merit a higher confidence than others. In accordance with one aspect of the present disclosure, degree of confidence is determined based on how close to expectations the statistical attributes of the obtained measurements come. For example, if the mean, median and/or variance of the obtained measurements come within 6% of expectations, a relatively high degree of confidence is assigned. On the other hand, if the statistical attributes of the obtained measurements are off by more than 30%, a relatively high degree of confidence is assigned. The degrees of confidence are expressed as weights for determining an interim performance index value for all the taken types of measurements as a weighted average of the taken types of measurements (sub-step 455*a*). The weights remain relatively fixed until it is determined that new types of task performance attributes need to be measured and accounted for in the computation of the final EUXv values for the artificial end users.

Also in step 455, an accounting (compensation) is made for the application success versus failure rates as already explained above. Also, an accounting is made for the sessions success versus failure rates as already explained above.

Finally, in step 457, the generated summarizing EUXv value for the current system configuration is compared against the counterpart summarizing EUXv values of contemplated other configurations to determine which configuration provides the best or a relatively acceptable among equals of end user experiences. That best or relatively acceptable configuration is then used for the stress-tested enterprise computer system.

The foregoing detailed description of the present disclosure of invention has been presented for purposes of illustration and description. It is not intended to be exhaustive or to limit the present teachings to the precise form disclosed. Many modifications and variations are possible in light of the above teachings. The described embodiments were chosen in order to best explain the principles of the teachings and their practical application to thereby enable others skilled in the art to best utilize them in various embodiments and with various modifications as are suited to the particular use contemplated.

What is claimed is:

1. A method for comparatively evaluating end user experiences (EUX's) for different configurations of an enterprise computer system, the method comprising:
   a) setting the enterprise computer system to at least temporarily have, for the comparative evaluating, a predetermined first configuration;
   b) defining a number of artificial end users and instantiating the artificial end users to each be able to drive a corresponding workstation with a respective copy of a predefined workload so as to be able to thereby stress the first configuration of the enterprise computer system with imposition by the respective instantiated artificial end user of the respective copy of the predefined workload;
   c) while all or a selected subpopulation of the instantiated artificial end users drive their corresponding workstations and thereby stress the first configuration with their respective copies of the predefined workload, measuring task performance attributes for each of the driving artificial end users;

d) collecting and saving the measured task performance attributes of the workload imposing artificial end users;
e) setting the enterprise computer system to at least temporarily have, for the comparative evaluating, a predetermined second configuration different from the first configuration;
f) performing steps (b) through (e) for the predetermined second configuration while the measuring of the task performance attributes remains the same as that for the predetermined first configuration;
g) comparing the measured task performance attributes of the first configuration with the measured task performance attributes of the second configuration and determining from the comparison which configuration provides a better end user experience; and
h) responsive to the comparing, setting the enterprise computer system to have, on a more than temporary-for-evaluation basis, the configuration that was determined to provide the better end user experience.

2. The method of claim 1 and further comprising:
after said step (d) of collecting and saving the measured task performance attributes, normalizing the collected attributes, the normalizing including humanizing the attributes on a per-type-of-attribute basis;
wherein said step (g) of comparing includes comparing the normalized attributes.

3. The method of claim 1, wherein:
the measuring of the task performance attributes includes measuring respective time durations for successfully completing each successfully completed task of the respective copy of the predefined workload.

4. The method of claim 1, wherein:
the measuring of the task performance attributes includes measuring respective time durations for successfully returning to, and presenting task outcome results on the respective workstation of each respective artificial end user.

5. The method of claim 1, wherein:
the measuring of the task performance attributes includes measuring respective time durations for successfully inputting via a respective user interface (UI) of each respective artificial end user, definitions of respective to-be-performed tasks.

6. The method of claim 1, wherein:
the measuring of the task performance attributes includes determining how many times each task of the respective copy of the predefined workload failed.

7. The method of claim 1, wherein:
while said step (f) performs steps (b) through (e) for the predetermined second configuration, the workload imposed by each of the artificial end users remains the same as that for the predetermined first configuration.

8. The method of claim 1, wherein:
while said step (f) performs steps (b) through (e) for the predetermined second configuration, the workload imposed by each of the artificial end users is different from that imposed for the predetermined first configuration.

9. The method of claim 1, wherein the workstations are physically real workstations.

10. The method of claim 1, wherein the workstations are virtual workstations.

11. The method of claim 1, wherein:
for the comparative evaluating, of one of the predetermined first and second configurations, the workstations are physically real workstations; and
for the comparative evaluating, of the other of the predetermined first and second configurations, the workstations are virtual workstations.

12. The method of claim 1, wherein the imposition of the respective workloads by the respective artificial end users stresses one or more remote resources of the configured enterprise computer system.

13. The method of claim 12, wherein the stressed remote resources reside in a remote cloud.

14. The method of claim 12, wherein the stressed remote resources reside in an Intranet network controlled by administrators of the configured enterprise computer system.

15. The method of claim 12, wherein the stressing of the one or more remote resources includes stressing one type of resource at a time, the one type of resource being selected from the group consisting of: a data processor, and a data storing device, a data communicating device.

16. The method of claim 12, wherein the respective workloads by the respective artificial end users each includes a base workload comprised of a predetermined text processing application, a predetermined graphics processing application and a predetermined data encrypting and decrypting application.

17. A method of monitoring performance of an enterprise computer system, the method comprising:
a) establishing within the enterprise computer system a relatively small sub-population of instantiated artificial end users operating concurrently with a larger population of human end users, the instantiated artificial end users having the ability to detect and report their respective end user experiences (EUX's); and
b) alarming an administrator of the enterprise computer system in response to one or more of the instantiated artificial end users detecting respective EUX's that breach a predetermined range of acceptable end user experiences and/or that trend toward breaching the predetermined range of acceptable end user experiences.

18. The method of claim 17, wherein the relatively small sub-population of instantiated artificial end users constitutes 5% or less of the total population of end users of the enterprise computer system.

* * * * *